United States Patent [19]

Uehara et al.

[11] Patent Number: 5,537,378

[45] Date of Patent: Jul. 16, 1996

[54] DATA PROCESSING DEVICE WITH CONTROLLED INSERTION OF RECORDING MEDIA

[75] Inventors: Nagatoshi Uehara; Hidenori Muramatsu; Hiroto Handa; Nobuhiro Satoh; Satoshi Kanno, all of Tokyo, Japan

[73] Assignee: Clarion Co., Ltd., Saitame-ken, Japan

[21] Appl. No.: 295,340

[22] Filed: Aug. 24, 1994

[30] Foreign Application Priority Data

Aug. 25, 1993 [JP] Japan .................................. 5-232429
Aug. 26, 1993 [JP] Japan .................................. 5-234159

[51] Int. Cl.$^6$ .............................................. G11B 17/035
[52] U.S. Cl. .................. 369/77.2; 360/97.02; 360/99.06
[58] Field of Search .............................. 369/34, 36, 77.1, 369/77.2, 178, 191, 192, 194, 291; 360/92, 93, 98.04, 98.06, 99.02, 99.03, 99.06, 99.07, 97.02

[56] References Cited

U.S. PATENT DOCUMENTS

| | | | |
|---|---|---|---|
| 4,179,718 | 12/1979 | Rolph | 360/99.06 |
| 4,205,355 | 5/1980 | Hamanaka et al. | 360/99.06 |
| 4,419,703 | 12/1983 | Gruczelak et al. | 360/97.02 |
| 4,641,212 | 2/1987 | Yokota et al. | 360/99.06 |
| 4,691,257 | 9/1987 | Taguchi | 360/97.02 |
| 4,754,471 | 6/1988 | Dieterlen | 369/77.1 |
| 4,785,365 | 11/1988 | Ohkita | 360/97.02 |
| 5,229,987 | 7/1993 | Aoki | 369/77.1 |
| 5,351,228 | 9/1994 | Kanno et al. | 369/77.2 |
| 5,408,459 | 4/1995 | Kawaguchi et al. | 369/77.2 |

Primary Examiner—John H. Wolff
Assistant Examiner—Paul J. Ditmyer
Attorney, Agent, or Firm—Price, Gess & Ubell

[57] ABSTRACT

A data processing device for holding a plurality of recording medium cassettes has a housing with an aperture to receive and discharge the cassettes. A holding member can receive a cassette that has been inserted through the aperture and deliver the cassette to a storage rack for storing a plurality of cassettes. A shutter can be activated to close the aperture. A moving elevator plate contacts the holding device, the storage rack, and the shutter member to enable the aperture to be opened when the holding member can receive a cassette and to be closed when the holding member has been moved from a position adjacent the aperture.

8 Claims, 29 Drawing Sheets

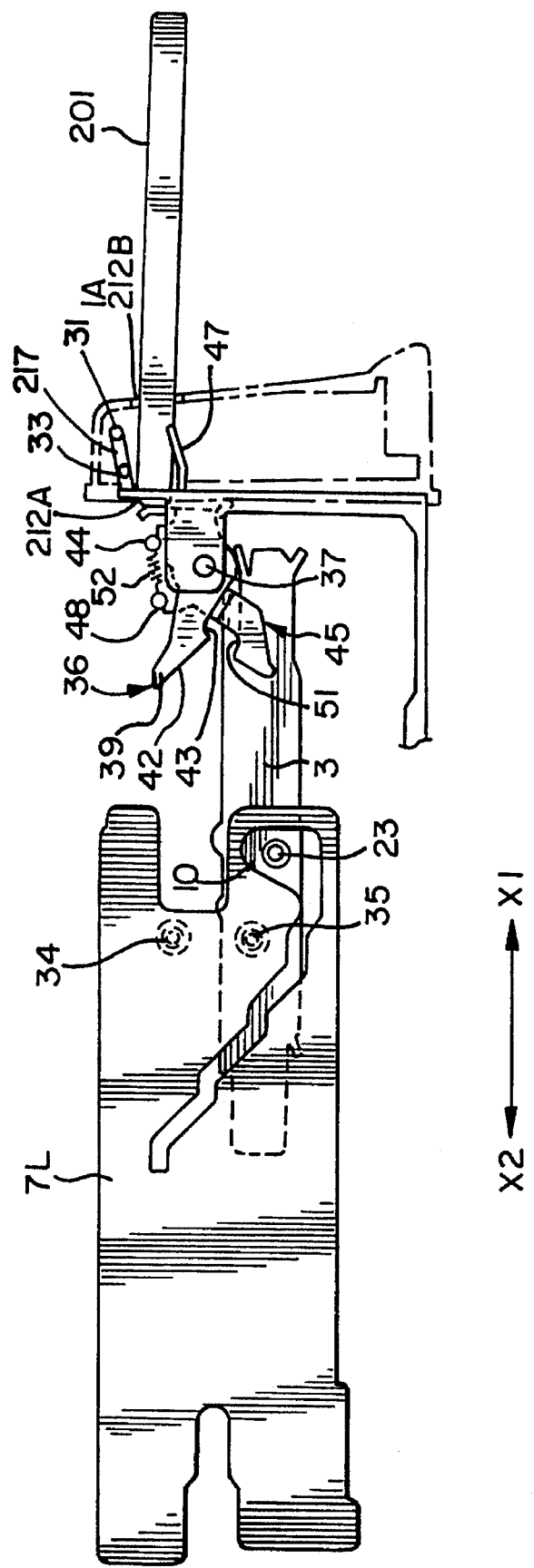

FIG. 9A
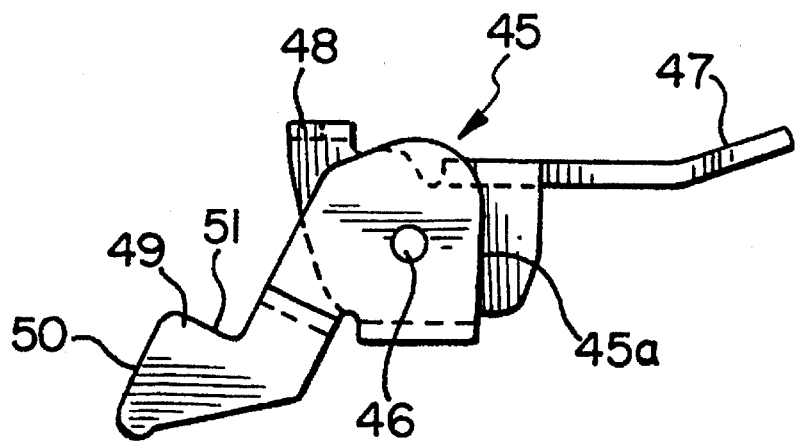
FIG. 9B
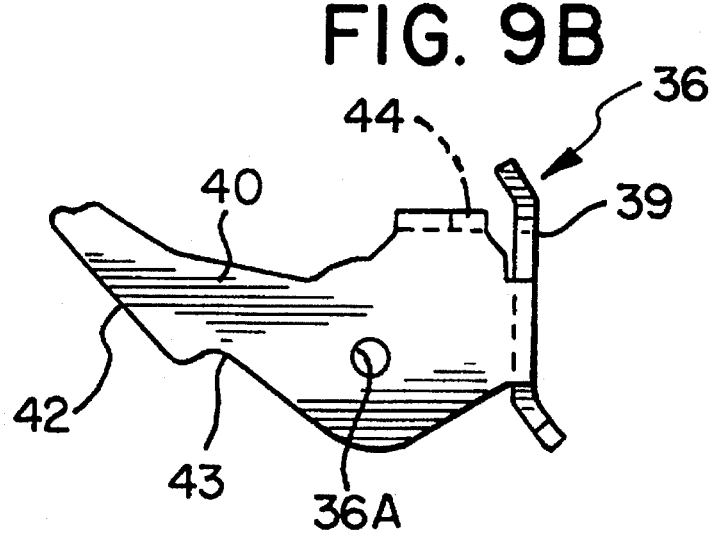
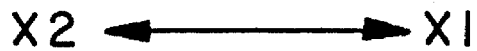

DATA PROCESSING DEVICE WITH CONTROLLED INSERTION OF RECORDING MEDIA

BACKGROUND OF THE INVENTION

1. Field of the Invention

The present invention relates to a data processing device, such as a recording/reproducing device for executing predetermined processing, for example, recording information on a recording medium, or reproducing the information recorded on the recording medium.

2. Description of Related Art

Conventionally, a Compact Disk (hereinafter referred to as the "CD") is widely known as a recording medium on which information is prerecorded. Recently, the following unit has been also becoming popular. A player provided with compartments referred to as "a magazine," which can be loaded with a plurality of CDs, is installed in the trunk of a car, while the main unit, referred to as "the control unit," is placed near the driver's seat. With this kind of system, the user is able to select any desired disk from the CDs stored in the trunk and play back music stored on the selected CD, without leaving the driver's seat.

On the other hand, another recording medium that has been developed in recent years is the Mini Disk (hereinafter referred to as the "MD") which is a magneto-optical type recording medium containing an information recording disk in a protective case. With the MD, it is possible not only to replay prerecorded information, but also to record information and to erase and record over information already recorded.

A variety of products of a recording/reproducing type which can record or reproduce information in/from such MDs have been developed.

OBJECTS AND SUMMARY OF THE INVENTION

Accordingly, an object of the present invention is to provide a data processing device such as a CD player in which there is an improvement in ease of use for handling recording media, such as MD and, more particularly, an improvement in operational performance of a unit which enables the user to select any desired MD from a plurality of MDs loaded therein and to reproduce the information recorded on the selected MD.

For this purpose, according to the present invention, there is provided a data processing device comprising: holding means for holding a cassette member encasing a recording medium in which information to be processed by the device is stored, the cassette member being inserted into the device through an insertion slot; lifting means for moving the holding means vertically; an opening/closing means for opening/closing the insertion slot which are disposed inside the insertion slot so as to be vertically swingable; a spring for urging the shutter means so as to close the insertion slot; and a shutter controlling means for controlling the opening/closing of the opening/closing means when the holding means is moved to a position in which the holding means faces the insertion slot by means of the lifting means.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 8 is a side view showing the relationship between the opening/closing mechanism and the left elevator plate;

FIG. 9A is a side view showing the door controlling member which is used in the opening/closing mechanism shown in FIGS. 6–8;

FIG. 9B is a side view showing a shutter which operates interlocked with the operation of the opening/closing mechanism shown in FIGS. 6–8;

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide a data processing device such as a CD player with controlled insertion of cassettes.

A vehicle-mounted MD unit which is a data processing unit according to an embodiment of the present invention will be described with reference to the accompanying drawings.

The MD unit is adapted to load an MD therein so as to record or reproduce information recorded on the MD.

Figure 1:
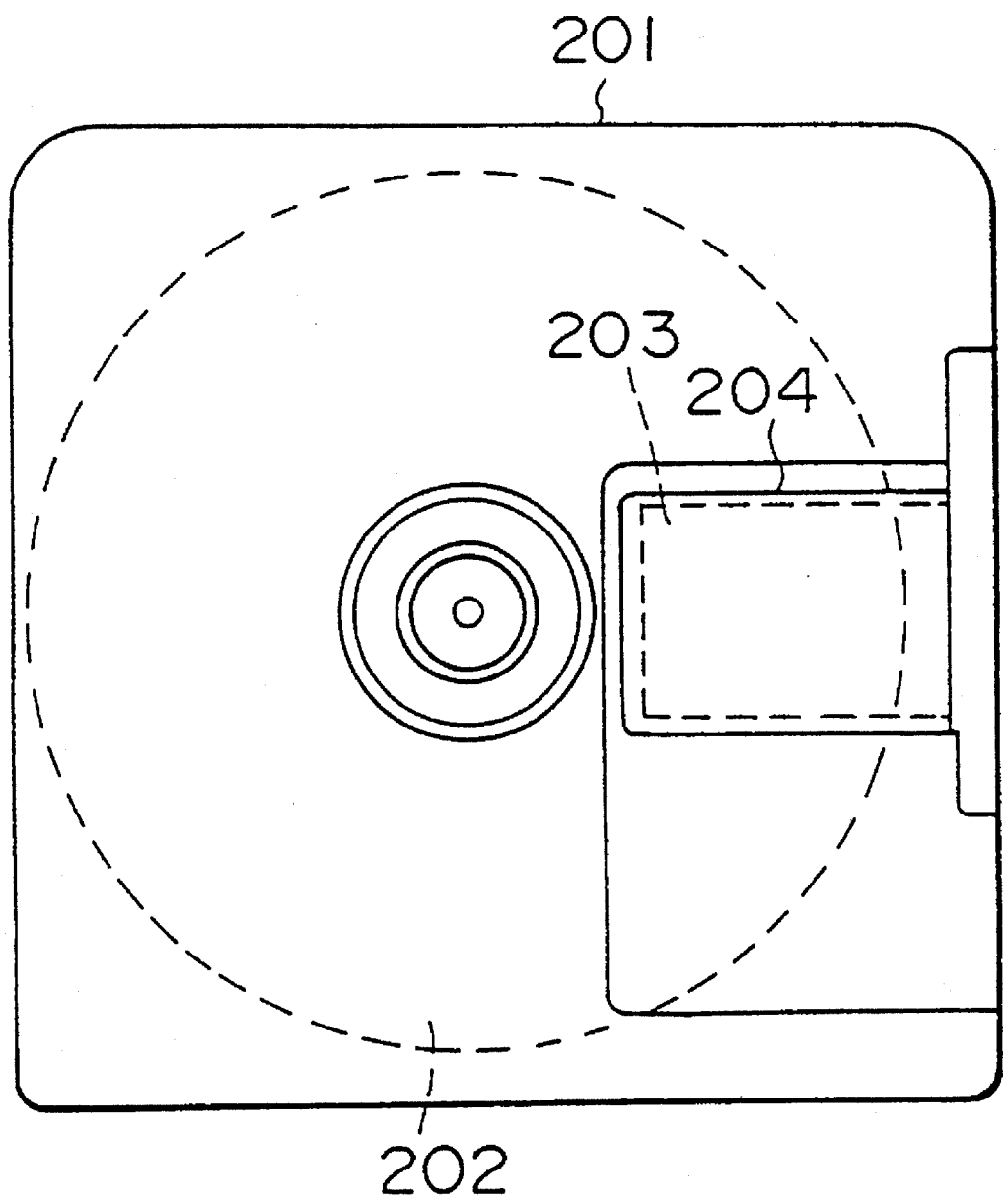
FIG. 1 is a plan view showing the construction of the MD (mini disk) which can be used in an MD unit of the present invention.

First, an MD applicable to the MD unit which is an embodiment of the present invention will be described. FIG. 1 is a plan view thereof.

Referring to FIG. 1, reference numeral 201 designates a cassette case, numeral 202 designates a disk body for recording information which is a magneto-optical disk having a diameter of approximately 6 cm stored in the cassette case 201, numeral 203 designates an access window arranged in the cassette case 201 so as to allow the disk to be accessed therethrough, and numeral 204 designates a slide shutter (hereinafter referred to the "shutter") for opening or closing the access window 203. Since the shutter 204 is closed except in use, the disk body is protected from an external environment thereby ensuring excellent applicability and durability.

There are two different types of the MDs: a read only premastered type in which preliminarily fixed information is recorded and recordable type in which information can be written. The premastered type shutter 204 is arranged only on one side of the cassette case 201. When the shutter 204 is open, a light beam from a pickup described later can be irradiated to the surface of the disk body 202. On the other hand, the recordable type shutters 204 are provided on both sides of the cartridge case 201. When information is recorded on the disk body 202, a magnetic head for applying a magnetic field comes into contact with the disk side to which a light beam is irradiated and the opposite side of the disk.

Unless otherwise stated, a recording medium including the aforementioned cassette case 201 and the disk body 202 is hereinafter referred to as a "disk" for convenience for description.

Figure 2:
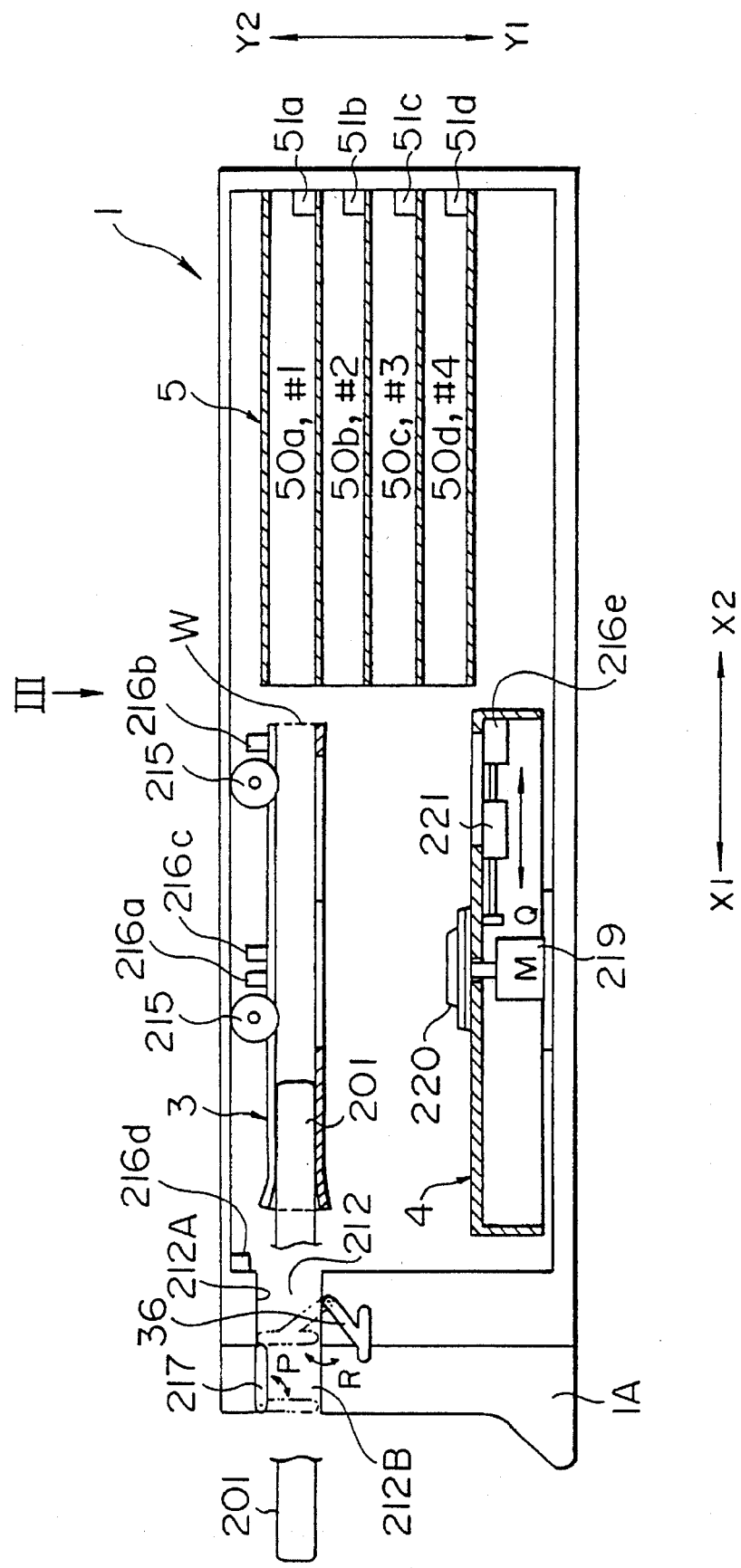
FIG. 2 is a sectional view schematically showing the internal construction of a vehicle-mounted MD unit according to an embodiment of the present invention.

Referring to FIG. 2, the MD unit according to the present embodiment in which information is reproduced from or recorded in the disk will be described below. The arrows X1 and X2 in FIG. 2 indicate the horizontal direction of the MD unit, and the arrows Y1 and Y2 indicate the vertical direction thereof. The arrows X1 and X2 refer to the front side and the rear side, respectively, of the MD unit, and the arrows Y1 and Y2 refer to the bottom side and the top side, respectively.

FIG. 2 is a sectional view schematically showing the internal construction of the MD unit when a disk is inserted therein. The MD unit comprises respective components disposed within the case 1 of rectangular parallelepiped. An escutcheon 1A is mounted on the front side of the case 1 and a front panel (not shown) in which operating keys and information indicators are arranged is provided.

An insertion slot 212A through which a disk is inserted is formed at the upper front end of the case 1, and an insertion slot 212 for receiving a disk inserted from outside is formed so as to face an insertion slot 212B which is provided on the escutcheon 1A. An opening/closing door 217 for preventing foreign matter from entering into the MD unit is attached to the insertion slot 212B so as to be pivotable in the direction indicated by the arrow P. Also, a shutter for preventing foreign matter from entering into the device is disposed at the insertion slot 212A of the case 1 so as to be pivotable in the direction indicated by the arrow R.

The case 1 includes a carrier 3 for transferring and holding a disk inserted through the insertion slot, a player portion 4 for rotating a desired disk selected from the disks stored in a stocker 5, described later, and the stocker 5 for storing the disks inserted into the case.

The aforementioned carrier 3 is placed behind the insertion slot 212 so as to be vertically movable. A pair of feeding rollers, front and rear, are rotatably placed above the carrier 3 so as to load the inserted disk into the carrier 3, store the loaded disk into the aforementioned stocker 5, and further eject the disks placed on the carrier 3 through the aforementioned insertion slot 212A to outside of the device.

A variety of sensors are also mounted on the carrier 3 so as to detect that a disk has been inserted, loaded, and ejected and the like. Such sensors include a disk insertion sensor 216a for detecting that a disk has been inserted, a loading completion sensor 216b for detecting that a disk has been completely loaded in the carrier, an eject sensor 216c for detecting that a disk has been ejected through the insertion slot 212, and a disk removal sensor 216d for detecting that a disk has been removed from the unit.

The above-mentioned loading completion sensor 216b detects that a disk has been completely loaded into the carrier 3 by sensing that the forward end of the disk load by the feeding rollers 215 has reached the position w in FIG. 2; that is, the rearmost end of the carrier 3. The eject sensor 216c detects that a disk has been ejected from the carrier 3 to a position in which the disk can be taken out of the aforementioned insertion slot 212; that is, the reloading position in which a part of the disk is protruding from the case 1. The disk removal sensor 216d is placed nearby the insertion slot 212 to detect that the disk which has been moved to the reload position has been removed.

The carrier 3 includes a carrier position sensor (not shown) for accurately detecting the vertical position of the carrier 3. The carrier position sensor is capable of vertically aligning the position of the carrier 3, the position of the insertion slot 212 and the position of one of respective compartments stored in the stocker 5, thereby smoothly preforming the horizontal movement of the disk; that is, the movement of the disk between the insertion slot 212 and the carrier 3 or the movement of the disk between the carrier 3 and one of the respective compartments stored in the stocker 5.

The aforementioned player portion 4 is placed underneath the carrier 3 so that the player portion 4 faces the carrier 3 and is resiliently fixed to the case 1 through a damper (not shown) or an antivibration spring (not shown). Thus, when a disk is being rotated, the player portion 4 is in a state in which it is resiliently supported by the damper or the antivibration spring, thereby preventing any external vibration applied to the case 1 from being transmitted to the player portion 4. The player portion 4 is constructed to be fixed to the case 1 when the disk is not being rotated. When a disk is being rotated, the carrier 3 loaded with the disk is placed on the player portion 4.

The player portion 4 includes a spindle motor 219 for rotating a disk, a turntable 220 for having a disk mounted thereon, and a pickup (PU) 221 which applies a light beam to a disk so as to read information from the disk, the pickup being constructed to slide radially with respect to a disk mounted on the turntable 220; that is, to slide in the direction indicated by the arrow Q in FIG. 2. Also mounted on the player portion 4 is a disk mounting completion sensor 216e which detects that the disk has been placed on the turntable 220 by sensing that the cassette case 201 abuts against the sensor 216e.

The aforementioned stocker 5 is a rectangular parallelepiped case in which four compartments 50a–50d for storing disks therein are vertically stacked. The stocker 5 is placed further behind the carrier 3 relative to the insertion slot 212 so as to be vertically movable. The compartments 50a–50d are identified as numbers #1–#4, the compartment 50a being #1, the compartment 50b being #2, the compartment 50c being #3, and the compartment 50d being #4. The identification numbers #1–#4 correspond to the order of storing disks when the unit is in stock mode described below, the compartments 50a–50d sequentially storing disks, starting from #1, followed by #2, #3, and #4.

An opening is formed at the front of each of the compartments 50a–50d so as to receive a disk through such an opening, and behind the opening is a space in which a disk can be horizontally stored. The compartments 50a–50d are provided with stock completion sensors 51a–51d, respectively, for detecting completion of storing disks and with a disk eject/pull-in mechanism (not shown) for ejecting/pulling disks from/into the compartments by the urging force of the springs.

As described above, the door 217 is disposed at the insertion slot 212 so as to freely open and close. The door 217 is in an unlocked state when the carrier 3 is positioned oppositely facing the insertion slot 212. The door 217 is in a locked state when the carrier 3 is placed in any position other than the carrier 3 being placed oppositely to the opening of the compartment 50a. When the insertion slot 212 and the carrier 3 are not positioned to face each other, the door 217 is locked, thereby preventing foreign matter from entering into the MD unit.

Figure 3:
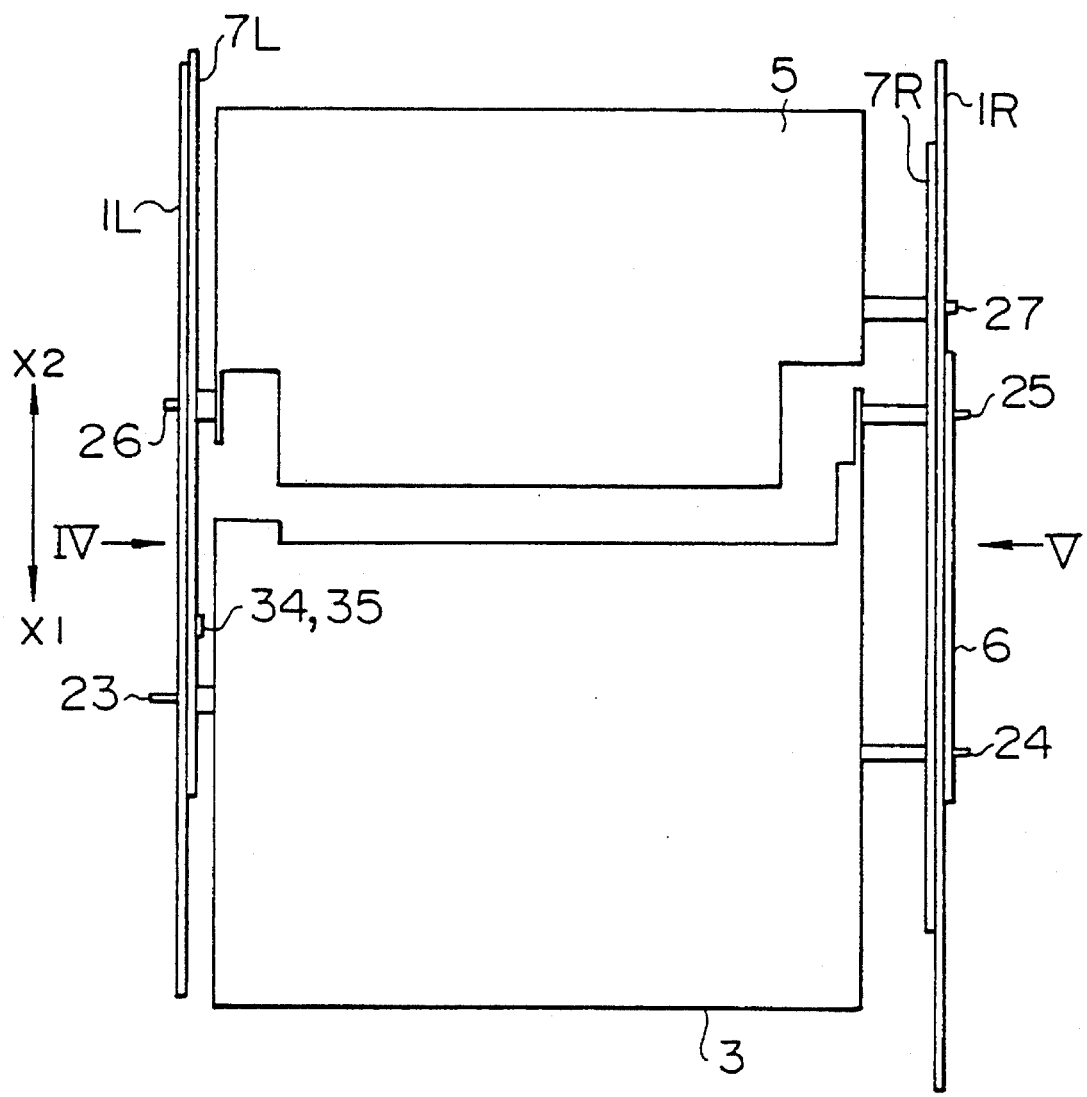
FIG. 3 is a plan view schematically showing the relationship between the right/left elevator plates, a carrier and a stocker, the view being taken in the direction of the arrow III in FIG. 1.
Figure 4:
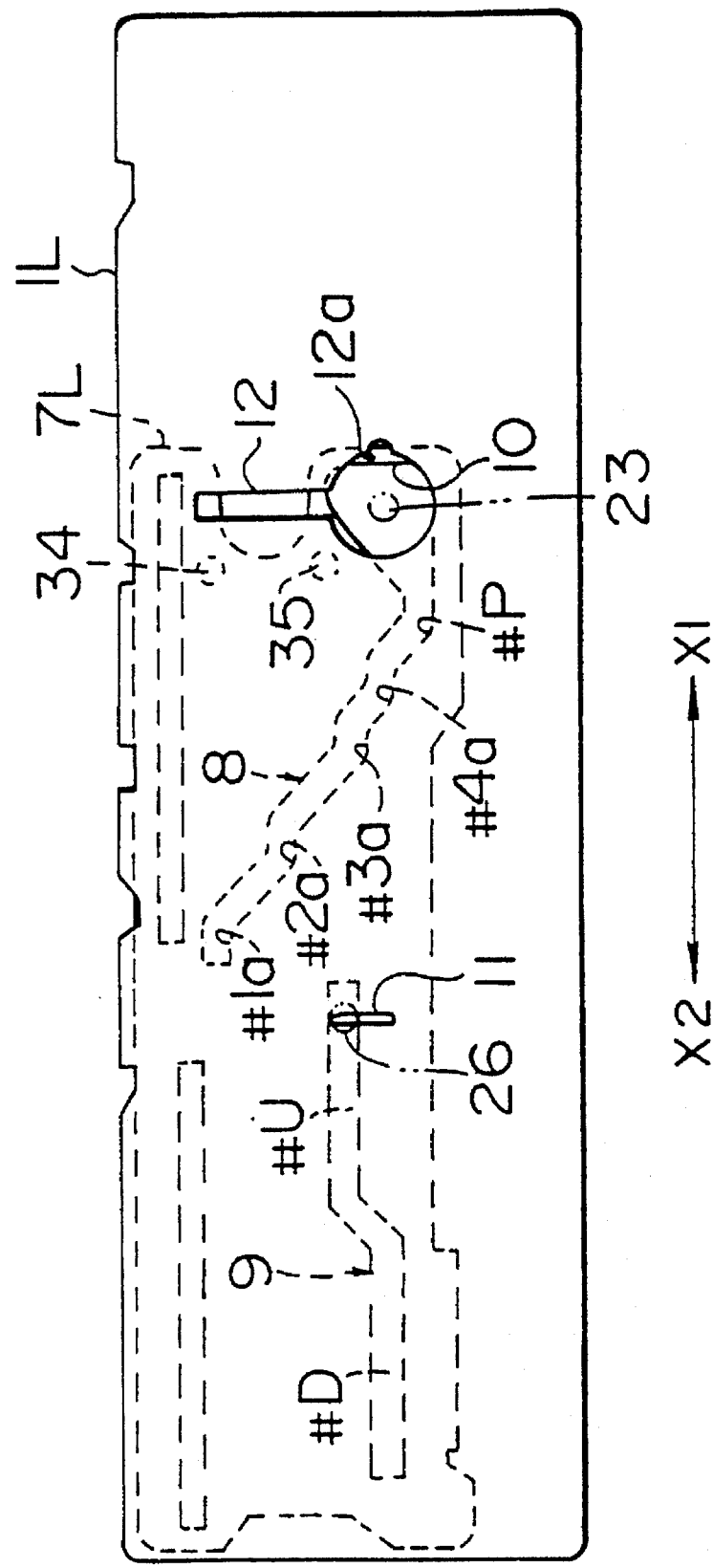
FIG. 4 is a side view taken in the direction of IV in FIG. 3.

Then, a lifting mechanism for lifting the aforementioned carrier 3 and the stocker 5 will be described below. FIG. 3 is a plan view schematically showing the relationship between the right/left elevator plates 7L, 7R indicated in the direction of the arrow III in FIG. 2, the carrier 3 and the stocker. FIG. 4 is a view taken in the direction of the arrow IV in FIG. 3 and FIG. 5 is a view taken in the direction of the arrow V in FIG. 3.

The lifting mechanism includes right/left elevator plates 7R, 7L which are disposed inside of the right/left sides 1R, 1L of the aforementioned case 1 so as to be movable along the depth thereof; that is, in the direction of X1–X2. The left elevator plate 7L has a carrier lifting cam 8 formed of a staircase-shaped hole which descends as the hole goes to the front, as shown in FIG. 4, and a stocker lifting cam 9. The respective steps from the highest step to the fourth step are designated to be #1a–#4a, and the lowest step is designated to be #P. The aforementioned elevator plate 7L has a hole portion 10 which is continuous with the lowest step #P in the aforementioned carrier lifting cam 8. The aforementioned stocker lifting cam 9 is formed in a crank shape having a top step #U and a low step #D.

Further, the aforementioned case 1 has a vertically long holding hole 11 which is formed on the left side 1L, a vertically long guide hole 12 which is located to the X1 side from the holding hole 11, and a hole portion which is continuous with the bottom end of the guide hole 12. The holding hole 11 intersects with the stocker lifting cam 9, and the hole portion 12a almost overlaps the aforementioned hole portion 10. A shutter side cam operating pin 34 and an opening member side cam operating pin 35 are disposed slightly apart in the direction of the X1 side from the center of the left elevator plate 7L so that they are positioned at almost the same position when viewed vertically with respect to the direction X1–X2.

Figure 5:
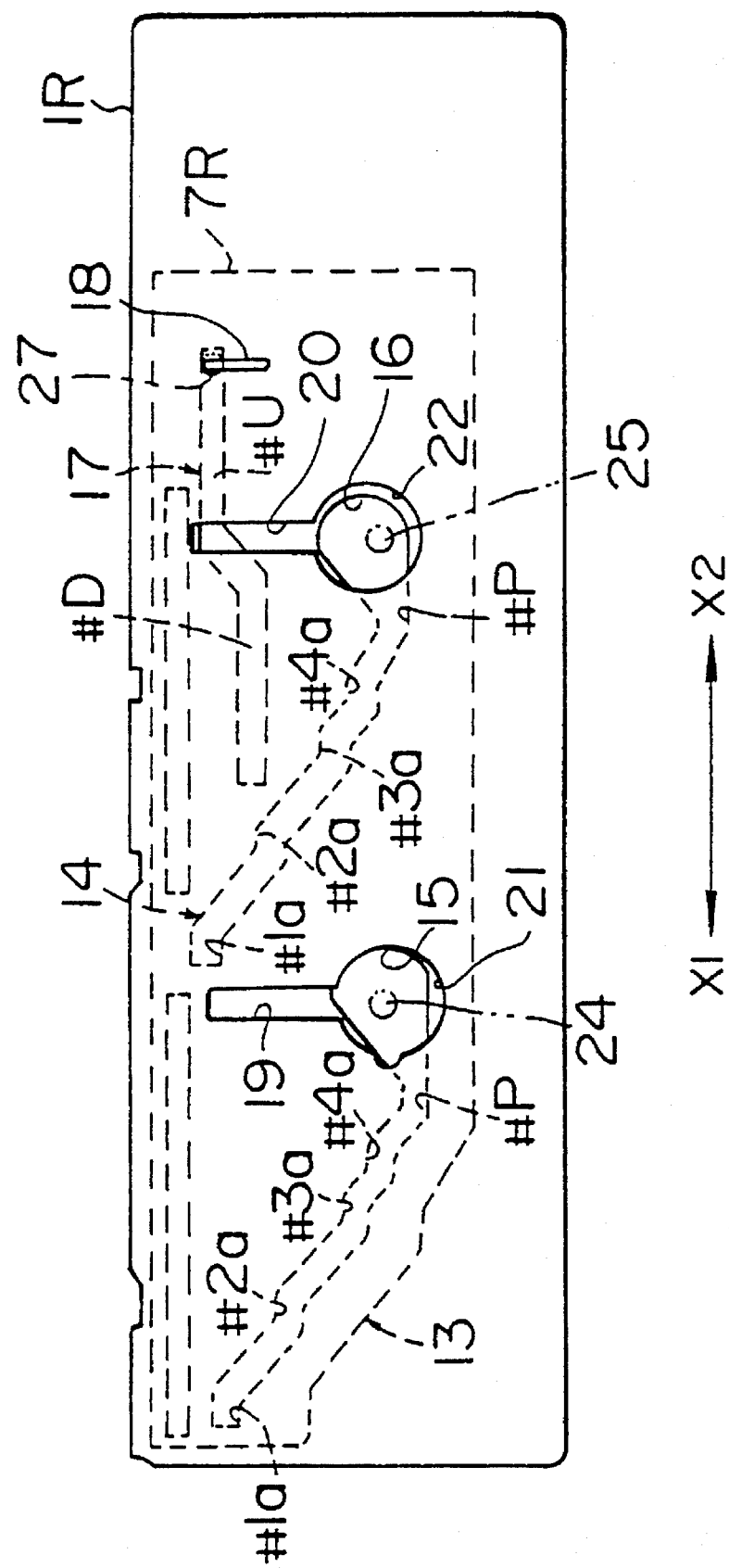
FIG. 5 is a side view taken in the direction of V in FIG. 3.

As shown in FIG. 5, the right elevator plate 7R has carrier lifting cams 13, 14 formed of staircase-shaped holes which descend from the X1 side to the X2 side. The steps disposed in the cams 13, 14 from the highest step to the fourth step are designated to be #1a–#4a, and the lowest step is designated to be #P. The aforementioned elevator plate 7R has hole portions 15, 16 which are continuous with the bottom steps #P of the holding cams 13, 14, respectively. Further, the right elevator plate 7R has a stocker lifting cam 17 which is formed to the X2 side from the cams 13, 14. The stocker lifting cam 17 is formed in the shape of a crank having the top step #U and the low step #D as in numeral 9 in FIG. 4.

The right side portion 1R of the aforementioned case 1 has a vertically long holding hole 18, vertically long guiding holes 19, 20 which are positioned to the X1 side from the holding hole 18, and hole portions 21, 20 which are continuous with the bottom portions of the guiding holes 19, 20. The holding hole 18 intersects with the stocker cam 17 and the hole portions 19, 20 almost overlap the aforementioned hole portions 15, 16, respectively. The pins 23, 24, 25 move up/down in the guide holes 12, 19, 20, respectively as the carrier 3 moves up/down. The pins 24, 25, 23 can move in the hole portions 21, 15, 22, 16 and the hole portions 12, 10, respectively, disposed on the left side plate. Consequently, the carrier 3 loaded with the cassette 201 is placed above the player portion 4, and the player portion 4 is resiliently supported by the aforementioned pins.

The right/left elevator plates 7L, 7R are moved in directions opposite to each other with respect to the direction X1–X2 by means of a known driving mechanism (not shown). That is, when the left elevator plate 7L is moved to the X1 side, the right elevator plate 7R is moved to the X2 side. When the left elevator plate 7L is moved to the X2 side, the right elevator plate 7R is moved to the X1 side.

The aforementioned carrier 3 has a pin 23 which is disposed at the left side thereof and pins 24, 25 which are disposed at the right side thereof. The aforementioned stocker 5 has a pin 26 which is disposed on the left side thereof and pins 26, 27 which are disposed on the right side thereof.

The left pin 23 goes through the carrier lifting cam 8 and the guiding hole 12 of the left elevator plate 7L, and the holder pin 24 which is located to the X1 side of the right elevator plate goes through the carrier lifting cam 13 and the guiding hole 19 of the right elevator plate 7R. The holder pin 25 which is located to the X2 side goes through the carrier lifting cam 14 and the guiding hole 20 of the right elevator plate 7R.

The left pin 26 of the stocker 5 goes through the stocker lifting cam 9 and the holding hole 11 of the left elevator plate 7L. The right pin 27 goes through the stocker lifting cam 17 and the holding hole 18 of the right elevator plate 7R.

According to the aforementioned construction, when the carrier 3 descends, the left elevator plate 7L is moved to the rear side; that is, in the direction of X2 by means of the aforementioned driving mechanism, and the right elevator plate 7R is moved to the front side; that is, in the direction of X1. Because the carrier lifting cam 8 descends as it goes to the X1 side, the holder pin 23 inserted into the holder cam is guided by the guide hole 12 and goes down when the left elevator plate 7L is moved. Because the carrier lifting cams 13, 14 descend as they travel to the X2 side, the holder pins 24, 25 inserted into the carrier lifting cams 13, 14, respectively, are guided by the guiding holes 19, 20 and go down when the right elevator plate 7R is moved. Thus, the aforementioned carrier 3 is moved in the direction of Y1; that is, moved down vertically, so that the pins 23, 24, 25 are located at any desired position of the steps #2a–#P of the carrier lifting cams 8, 13, 14. A disk held by the carrier 3 is placed so as to face one of the openings in the aforementioned compartments 50a–50d.

The carrier 3 is raised by driving the driving mechanism reversely. That is, raising of the carrier 3 is performed by a movement reverse to the descending of the carrier 3 in which the left elevator plate 7L is moved in the direction of the X1 side and in which the right elevator plate 7R is moved in the direction of the X2 side.

When a disk is stored in the compartment 50d which is located at the lowest position in the stocker 5, the pins 23, 24, 25 of the carrier 3 descend to the step #4a of the carrier lifting cams 8, 13, 14, and then the pins 26, 27 are moved from the low step #D to the high step #U. The aforementioned stocker 5 goes up slightly guided by the holding holes 11, 18. As a result, a disk contained in the carrier 3 faces the compartment 50d.

Figure 6:
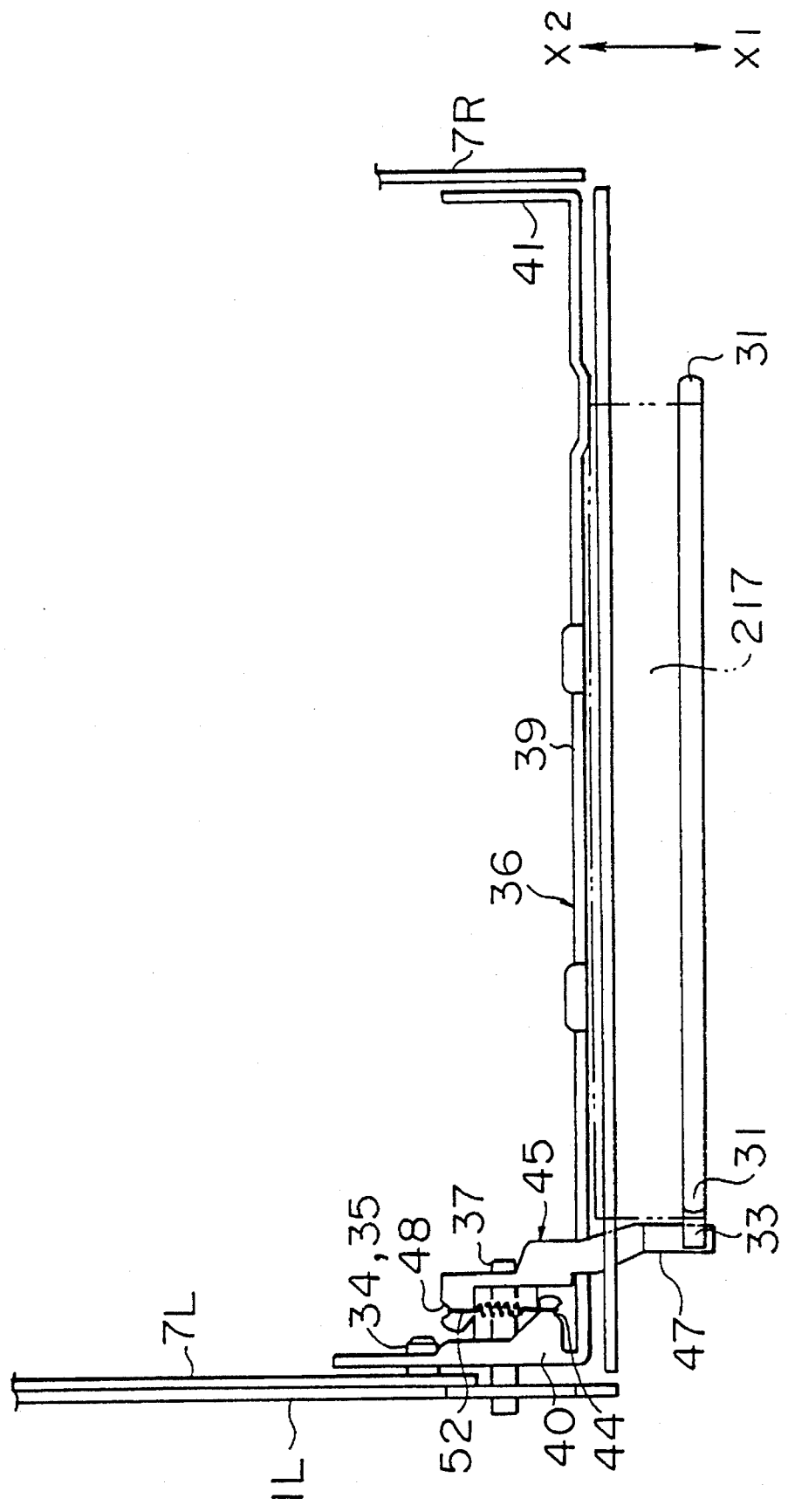
FIG. 6 is a plan view showing the disk insertion slot and the opening/closing mechanism of the insertion slot.
Figure 7:
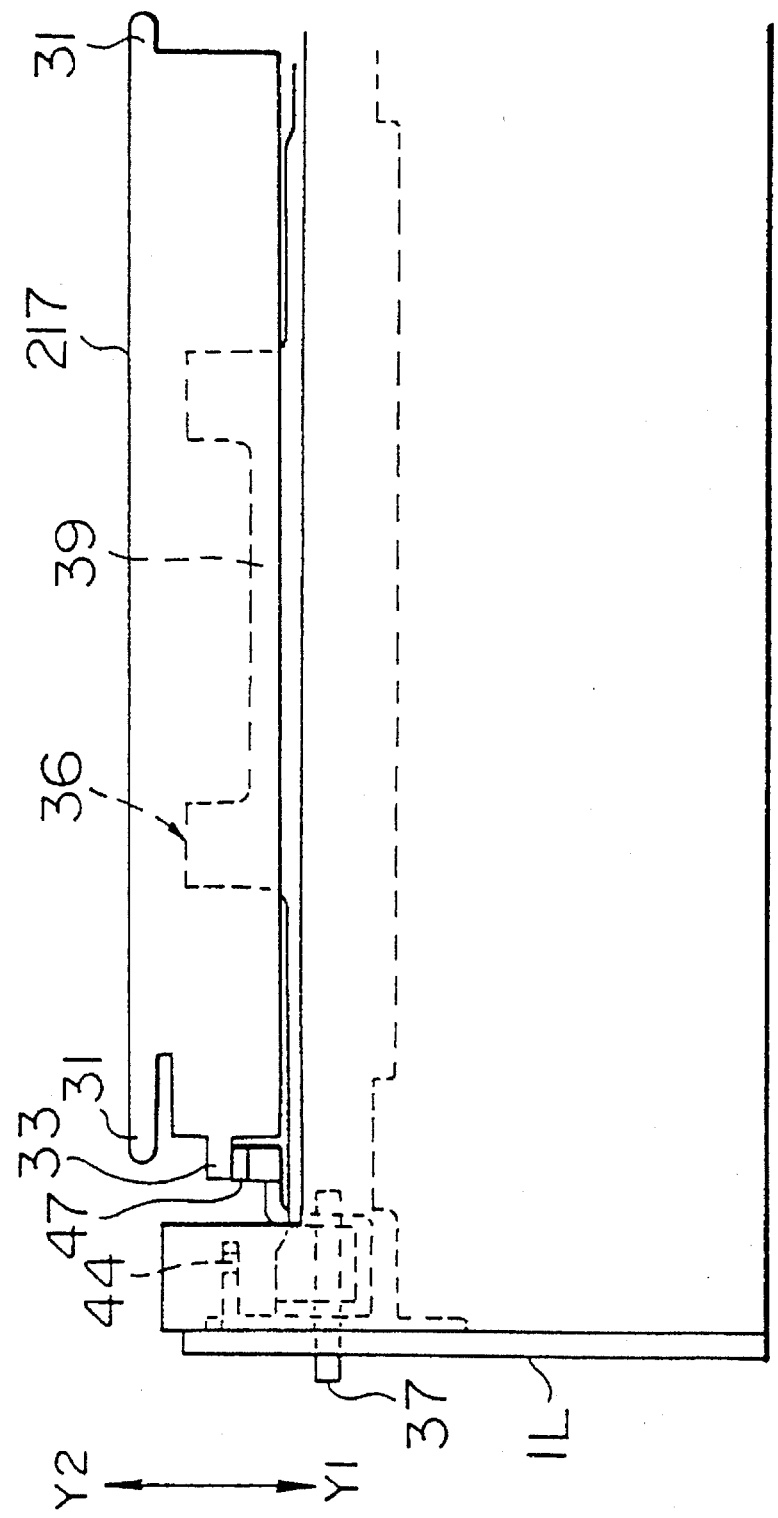
FIG. 7 is a front view showing the opening/closing mechanism shown in FIG. 6.

Next, the mechanism for opening or closing the insertion slot 212A of the case 1 and the insertion slot 212B of the escutcheon 1A is described below. FIG. 6 is a plan view of the opening and closing mechanism, FIG. 7 is a front view of the same opening and closing mechanism, and FIG. 8 is a side view for explaining the operation of the side of the opening and closing mechanism indicating the state in which the pin 23 is located in the hole portion 10 so that the carrier 3 is not facing the insertion slot 212. That is, the carrier 3 does not accept insertion of a disk. FIG. 9A is a side view of a member for opening and closing the door 217, and FIG. 9B is a side view of the shutter 36.

At the insertion slot 212B of the aforementioned S escutcheon 1A, the aforementioned door 217 is rotatably supported by a supporting portion (not shown) in which the right/left shaft supporting portions thereof are provided on the escutcheon 1A and the door 217 is mounted so as to be urged in the direction in which the insertion slot 212B is closed by a spring (not shown). The left end of the door 217 has a protrusion 33, which comes into contact with the lever portion 47 of the door controlling member 45.

A shutter 36 is provided on the forward side X1 of the right/left plates 1L, 1R of the aforementioned case 1 by a shaft so that the shutter is vertically swingable. The shutter 36 has arm portions 40, 41 which are provided on the right/left sides of the shutter body 39, and the arm portions 40, 41 are mounted on the X1 side of the right and left plates 1L, 1R of the case 1 by means of the aforementioned shafts 37 so that the arm portions are swingable in the direction of Y1–Y2 and the shutter body 39 opens or closes the aforementioned insertion slot 212A. In FIGS. 6, 7, and 8, only the left shaft is shown. The left arm portion 40 has a cam portion 42 which is formed on the front end bottom thereof, an engaging portion 43, and a spring locking portion 44 which is formed on the top end thereof. FIG. 9B is a side view of the shutter 36, in which the shaft 37, shown in FIG. 8, is inserted into the shaft hole 36A.

A door controlling member 45 which is coaxial with the shutter 36 is provided on the front side of the left plate of the case 1 so that the door controlling member is swingable in the direction of Y1–Y2. The door controlling member 45 has a member body 45a having a U-shaped cross-section, and a shaft hole 46 is provided on the member body 45a. Inside the member body 45a, a lever portion 47 is formed so as to protrude forward in the direction of X1 and a spring locking portion 48 is formed in the direction of X2. On the outside face of the member body 45a, an arm portion 49 is formed so as to protrude in the direction of X2. The arm portion 49 has the cam portion 50 and the engaging portion 51.

Figure 10:
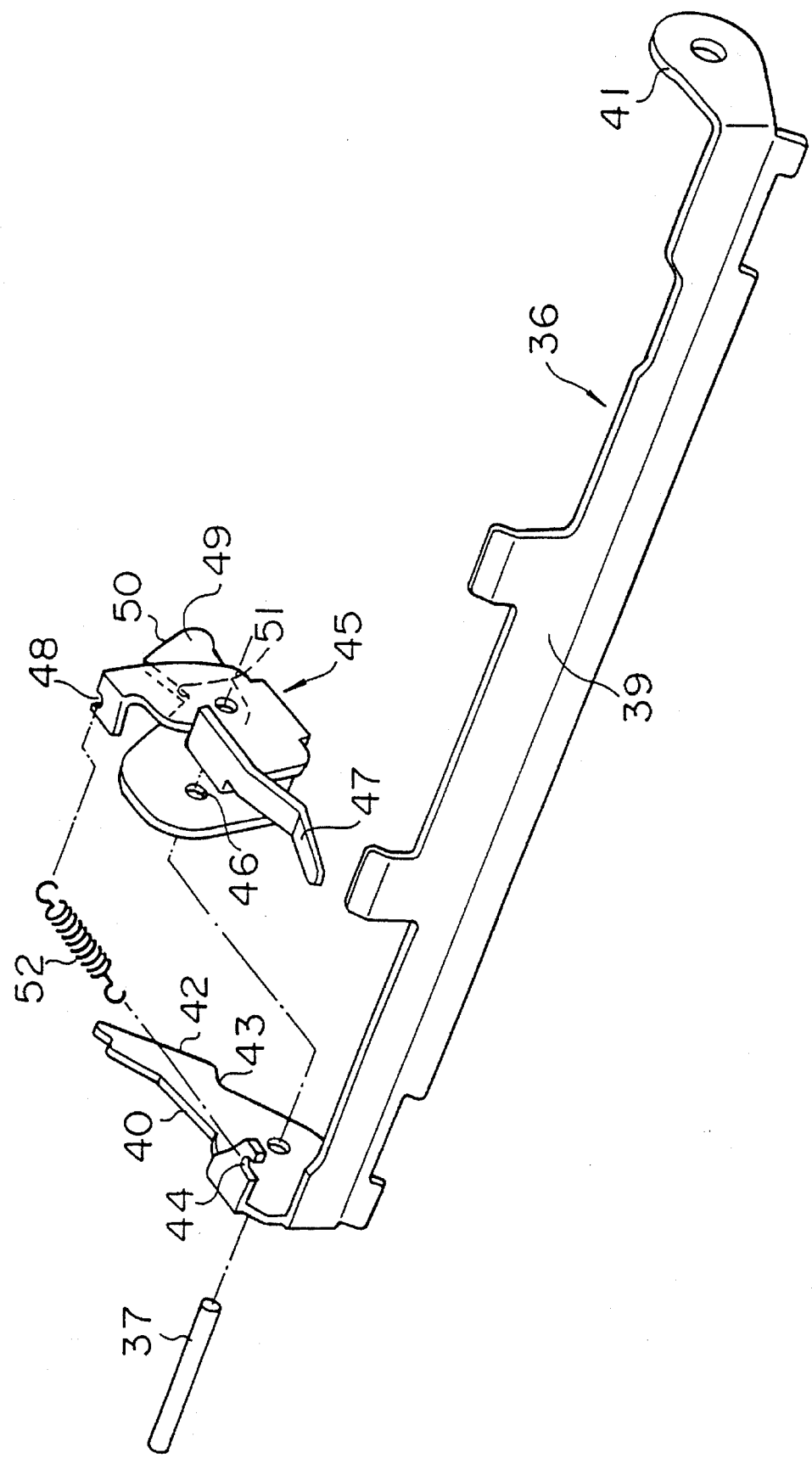
FIG. 10 is a disassembly perspective view showing the relationship between the door controlling member shown in FIG. 9 and the shutter shown in FIG. 10.

The aforementioned door controlling member 45 is provided on the forward side X1 of the left plate L1 of the case 1 so that the aforementioned shaft 37 is inserted through the shaft hole 46 of the member body 45a, and a spring 52 is laid between the spring locking portion 48 of the door controlling member 45 and the spring locking portion 44 of the shutter 36. FIG. 10 is a disassembled perspective view showing the relationship between the door controlling member 45, the shutter 36, and the spring 52.

In FIG. 8, the insertion preventive shutter 36 is revolved counterclockwise by the urging force of the spring 52, and the shutter body 39 closes the disk insertion slot 212. The door controlling member 45 is revolved clockwise by the urging force of the spring 52 so that the lever portion 47 is positioned below the protrusion 33 of the door 217 so that the lever portion is not in contact therewith.

Figure 11:
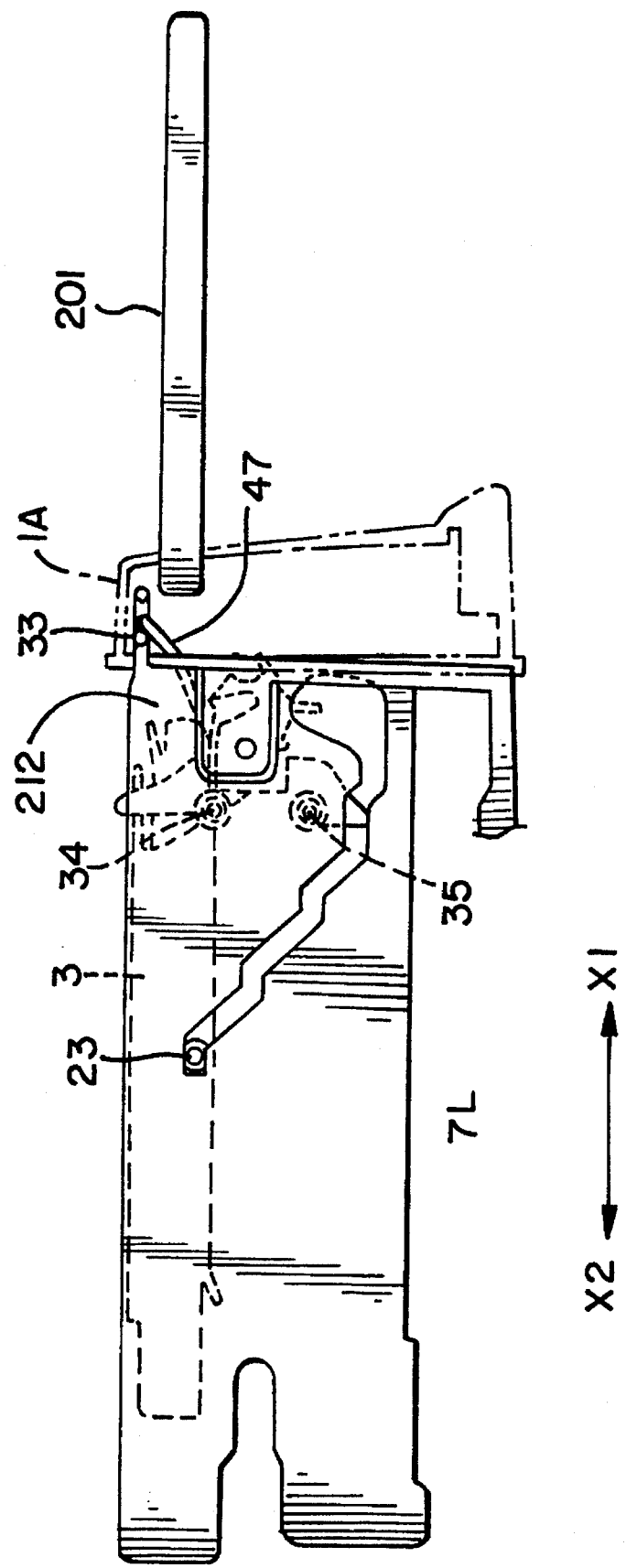
FIG. 11 is a side view for explaining the operation of the opening/closing mechanism and showing the state in which a disk can be inserted.
Figure 12:
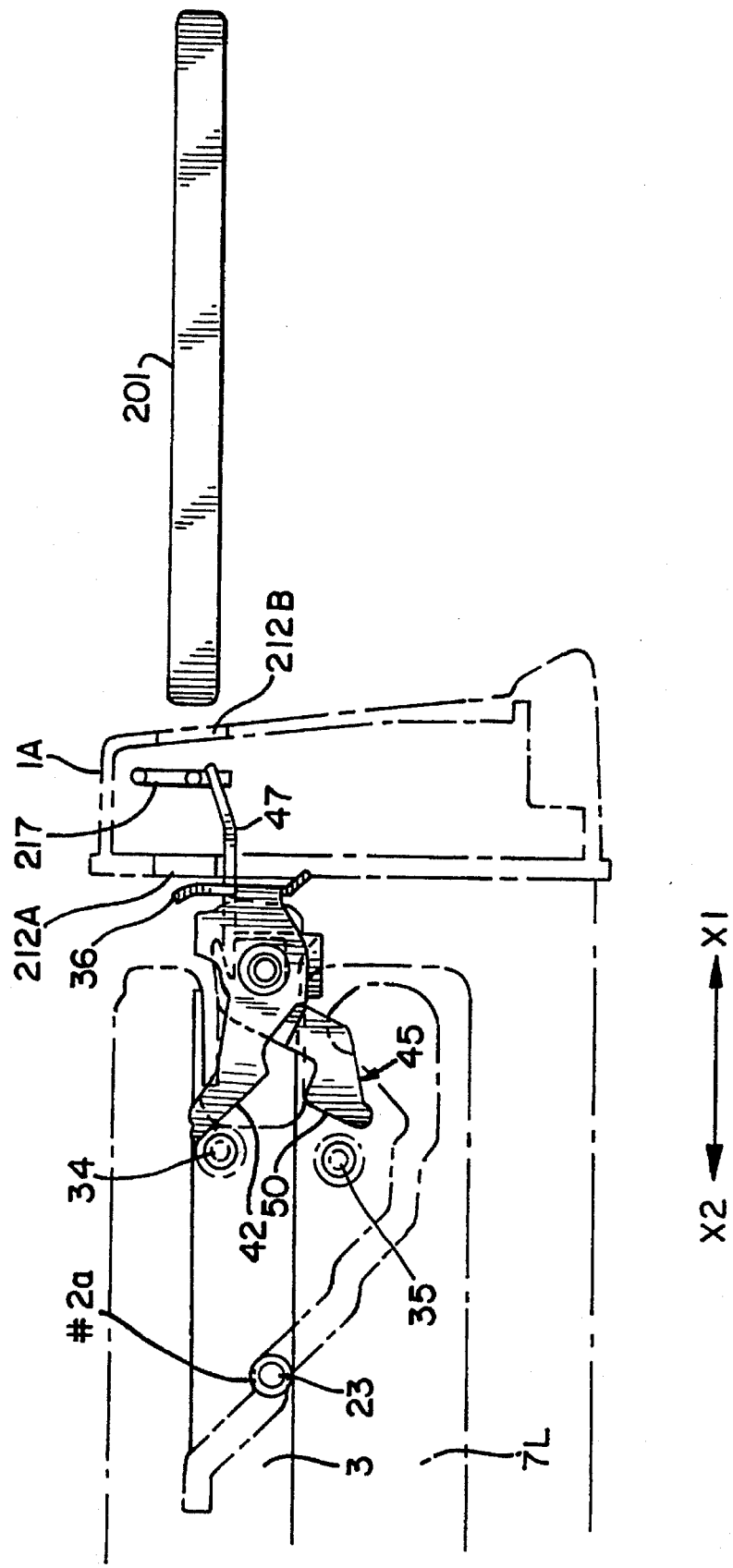
FIGS. 12 and 13 are side views for explaining the operation of the opening/closing mechanism and showing the state in which no disk can be inserted.
Figure 13:
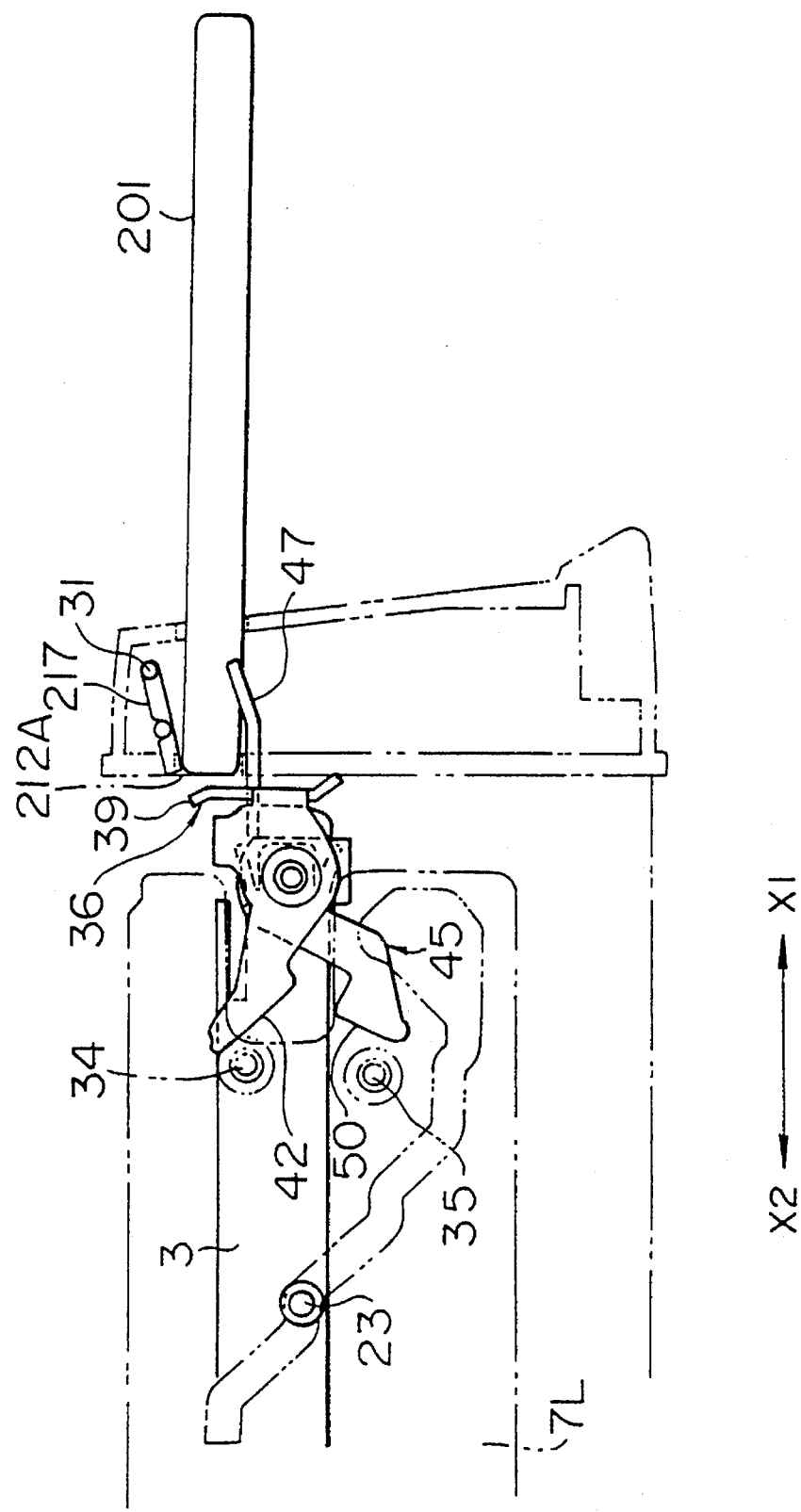

Next, the operation of the opening/closing mechanism for the door 30 and the shutter 36 having the aforementioned construction is described below. FIG. 11 shows the state in which the carrier 3 faces the insertion slot 212 so as to accept insertion of a disk. As shown in FIG. 12, the carrier 3 is moved from the position in which the holder pins 23, 24, 25 of the carrier 3 are located at the step #2a in the holder cams 8, 13, 14; that is, a position in which insertion of a disk cannot be accepted, to the position shown in FIG. 11, so that the door 217 and the shutter 36 become capable of accepting insertion of a disk. If the carrier 3 is located at a position in which the carrier 3 does not face the disk insertion slot 212, if the disk is inserted into the insertion slot 212B of the escutcheon 1A, the door 217 is depressed by the front end of the disk and then is rotated clockwise as shown in FIG. 13 with respect to the right/left shafts 31 while resisting the resilient force of the closing spring (not shown), thereby opening the insertion slot 29. However, because the disk insertion slot 212 of the case 1 is closed by the shutter body 39 of the shutter 36, the disk is not inserted into the device unit.

As described above, raising of the carrier 3 is performed by a motion reverse to that of descending the carrier 3 by moving the left elevator plate 7L to the X1 side, namely, to the front side by driving the driving mechanism reversely and moving the right elevator plate 7R to the X2 side; that is, to the rear side. By this operation, the carrier 3 is made to face the insertion slot 212 so that the carrier is capable of accepting insertion of a disk.

Figure 14:
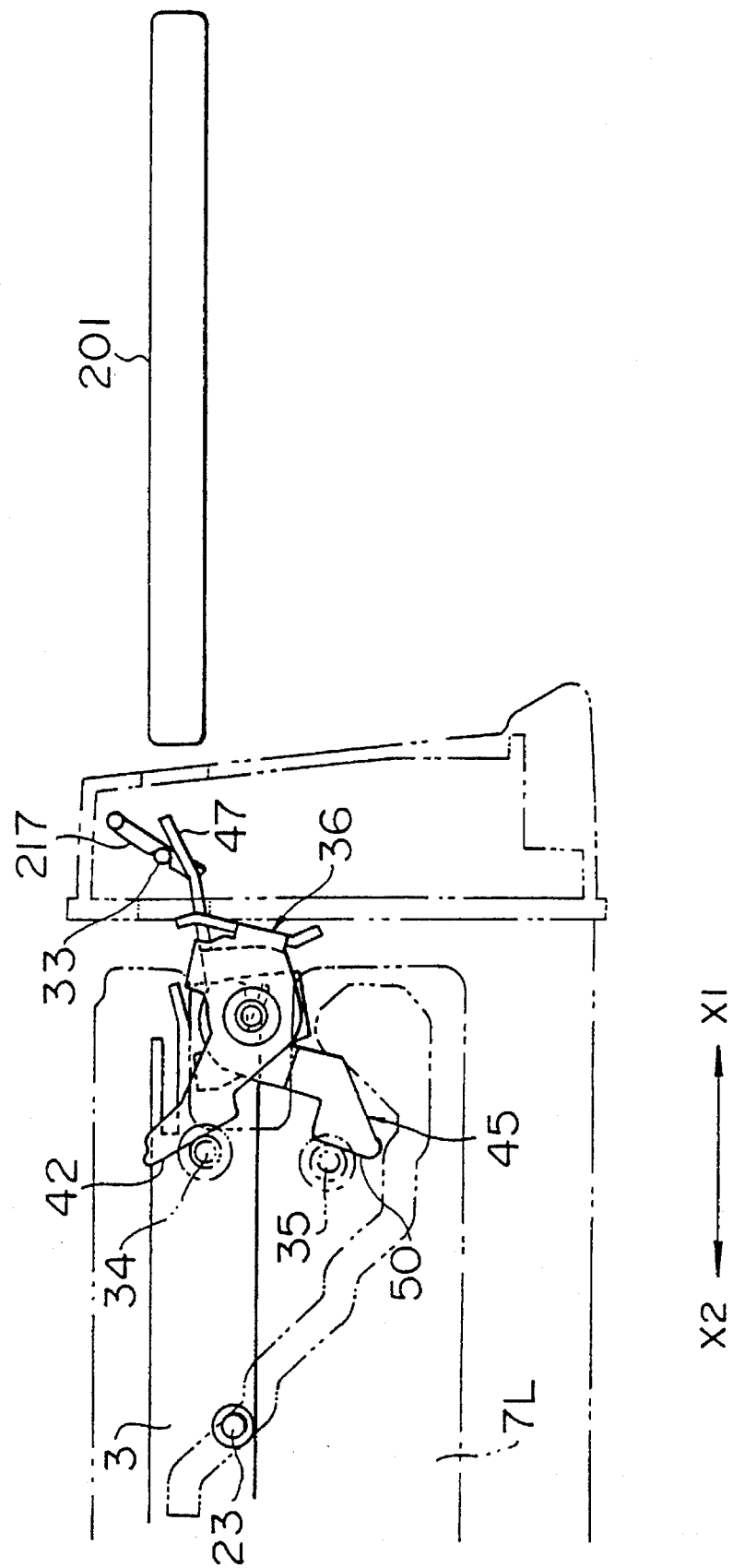
FIGS. 14–18 are side views for explaining the operation of the opening/closing mechanism and showing the relationship between the movement of the carrier and the operation of the opening/closing mechanism.
Figure 15:
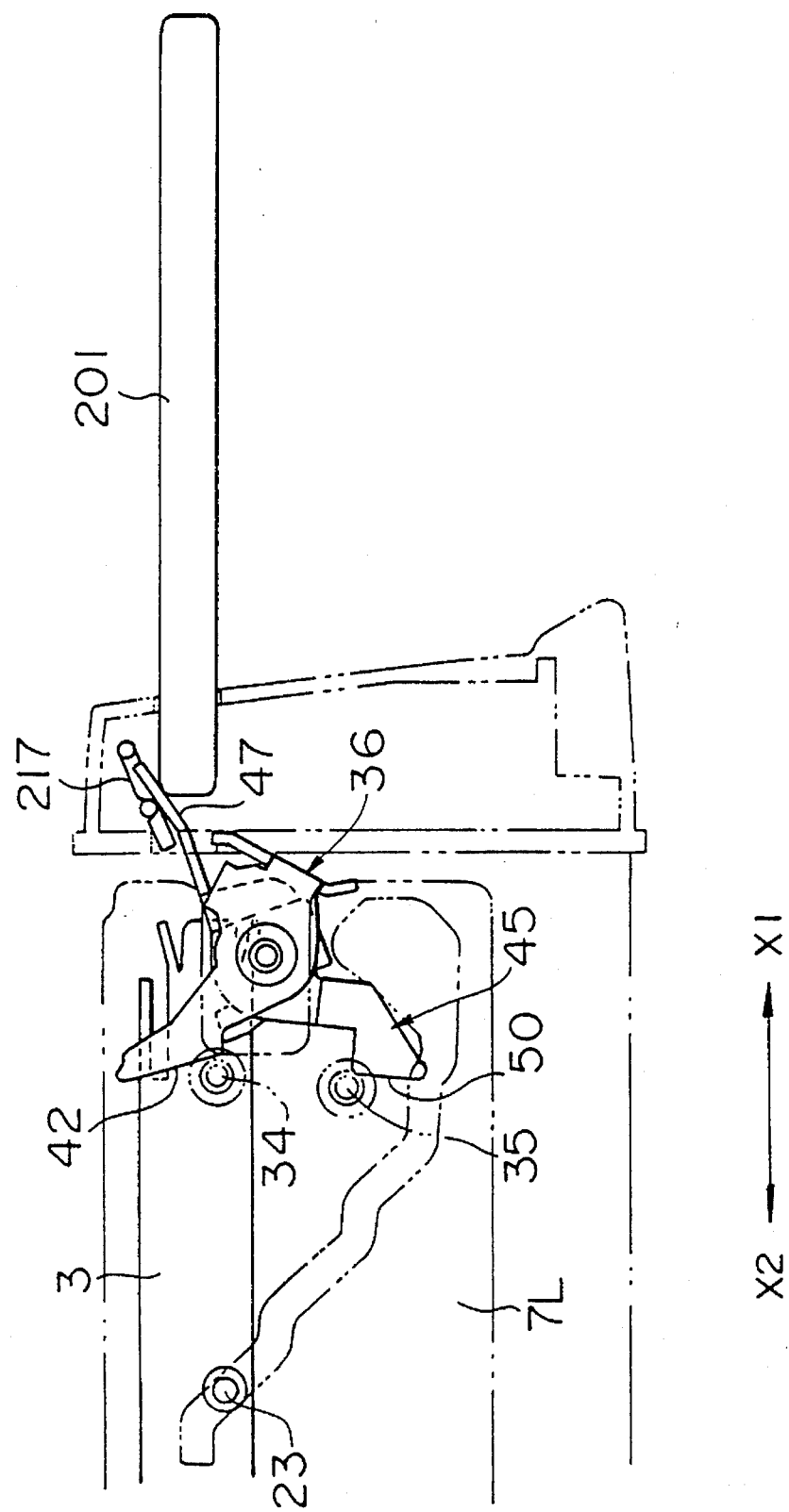
Figure 16:
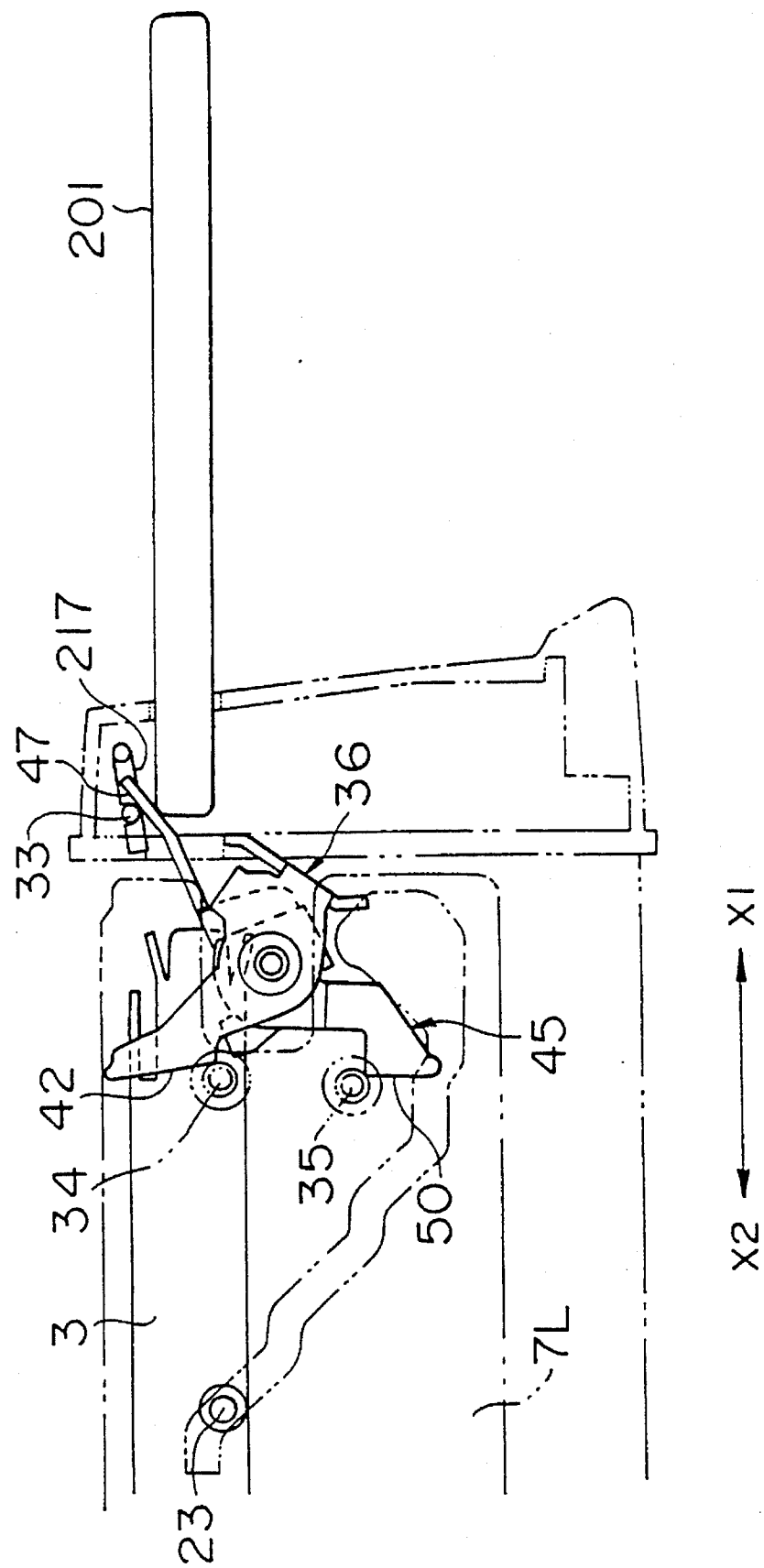
Figure 17:
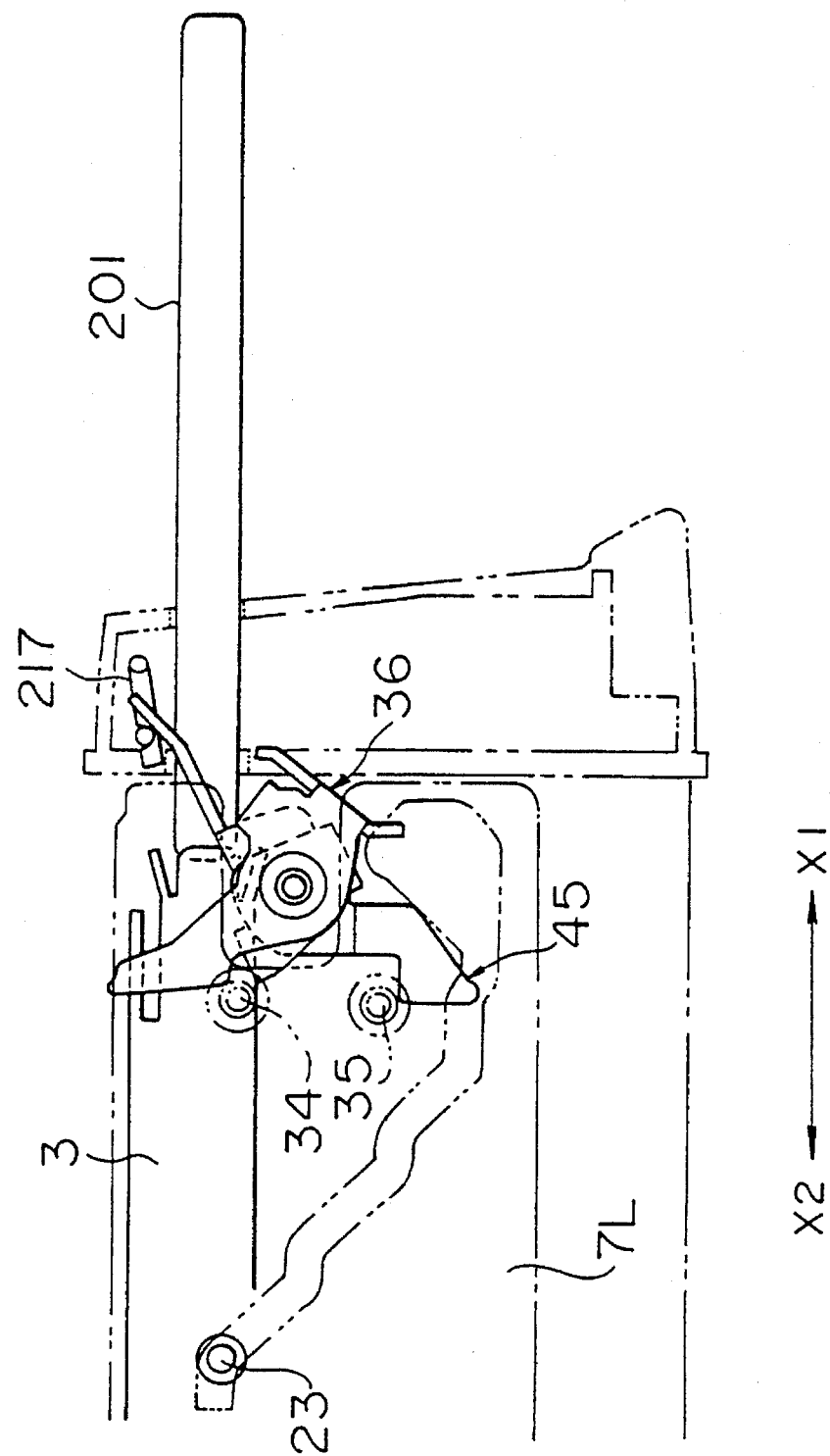
Figure 18:
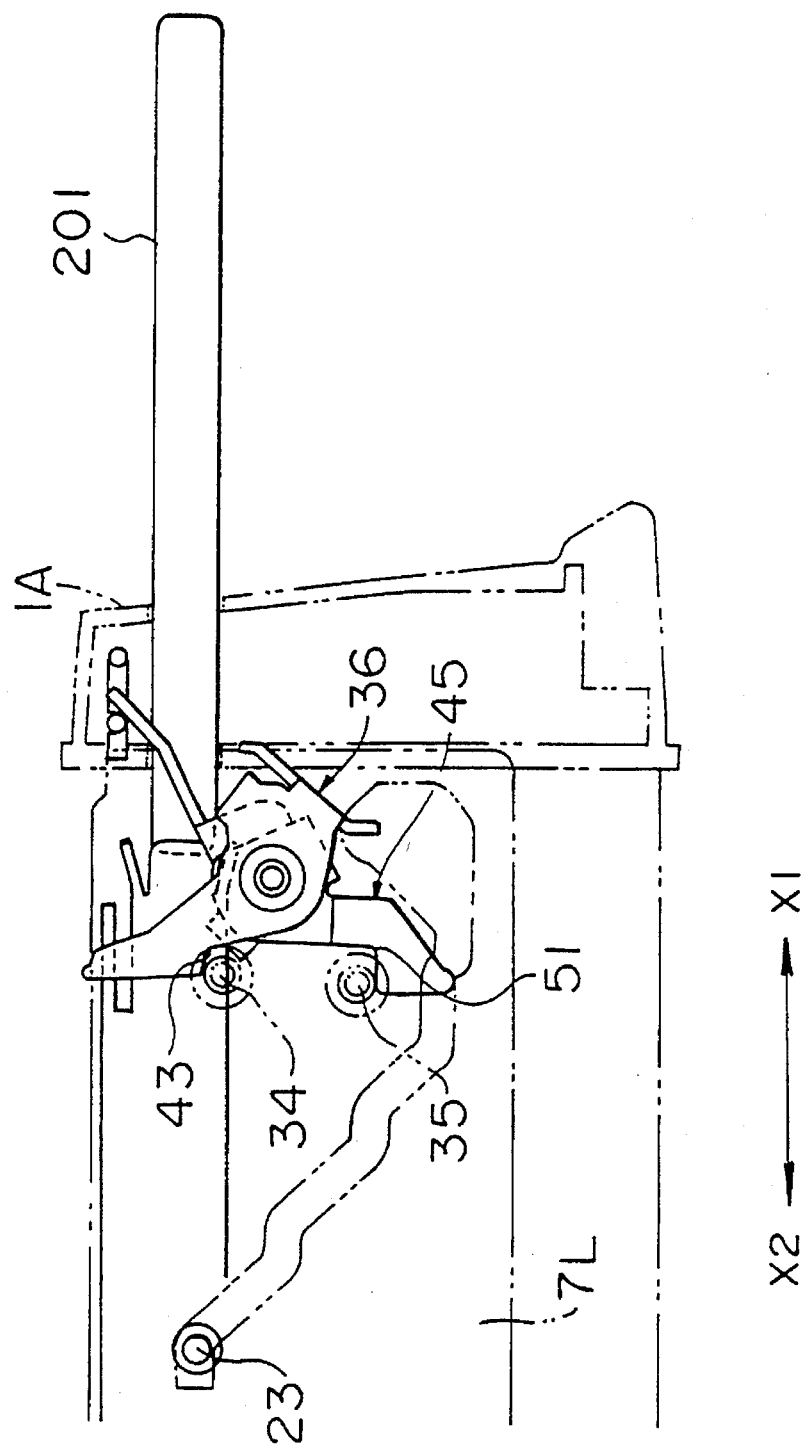

As shown in any figure of FIGS. 12–14, the left elevator plate 7L is moved to the X1 side so that the shutter side cam operating pin 34 is in contact with the cam section 42 of the shutter 36, thereby revolving the shutter 36 clockwise, and the opening member side cam operating pin 35 is in contact with the cam section 50 of the door controlling member 45, thereby revolving the dust preventive door controlling member 45 counterclockwise. Thus, the spring 52 which is laid between the spring locking portion 44 of the shutter 36 and the spring locking portion 48 of the door controlling member 45 is stretched, so that the shutter body 39 of the shutter 36 releases the disk insertion slot 212A of the case 1 and the lever portion 47 of the door controlling member 45 pushes the protrusion 33 of the door 217, thereby revolving the door 217 to open the insertion slot 212B of the escutcheon 1A. As shown in FIG. 18, the shutter side cam operating pin 34 is engaged with the engaging portion 43 of the shutter 36 so as to maintain the state in which the disk insertion slot 212A of the case 1 is open. At the same time, the opening cam operating pin 35 is engaged with the engaging portion 51 of the door controlling member 45 so as to maintain the state in which the insertion slot 212B of the escutcheon 1A is open.

In the process in which the carrier 3 is moved from the position in which the carrier 3 does not face the insertion slot to the position in which the carrier 3 faces the insertion slot, the shutter body 39 of the shutter 36 opens the disk insertion slot 212A of the case 1 and the lever portion 47 of the door controlling member 45 pushes the protrusion 33 of the door 217, thereby revolving the dust preventive door 217 to open the insertion slot 212B of the escutcheon 1A. That is, when the carrier 3 becomes capable of accepting insertion of a disk from the insertion slot 212, the insertion slot 212 is completely opened. Thus, the disk is inserted into the carrier 3 without being obstructed by the insertion slot.

The shutter 36 which is disposed at the disk insertion slot 212 so as to be freely opened or closed is released when the carrier 3 is located at a position in which the carrier 3 faces the disk insertion slot 212. When the carrier 3 is located at positions other than the position in which the carrier 3 faces the insertion slot 212, the insertion slot is locked. Thus, even if a disk is inserted, the dust preventive door is not revolved. Thus, with this state, an insertion of a disk by mistake as well as entering of foreign matter are prevented.

Figure 19:
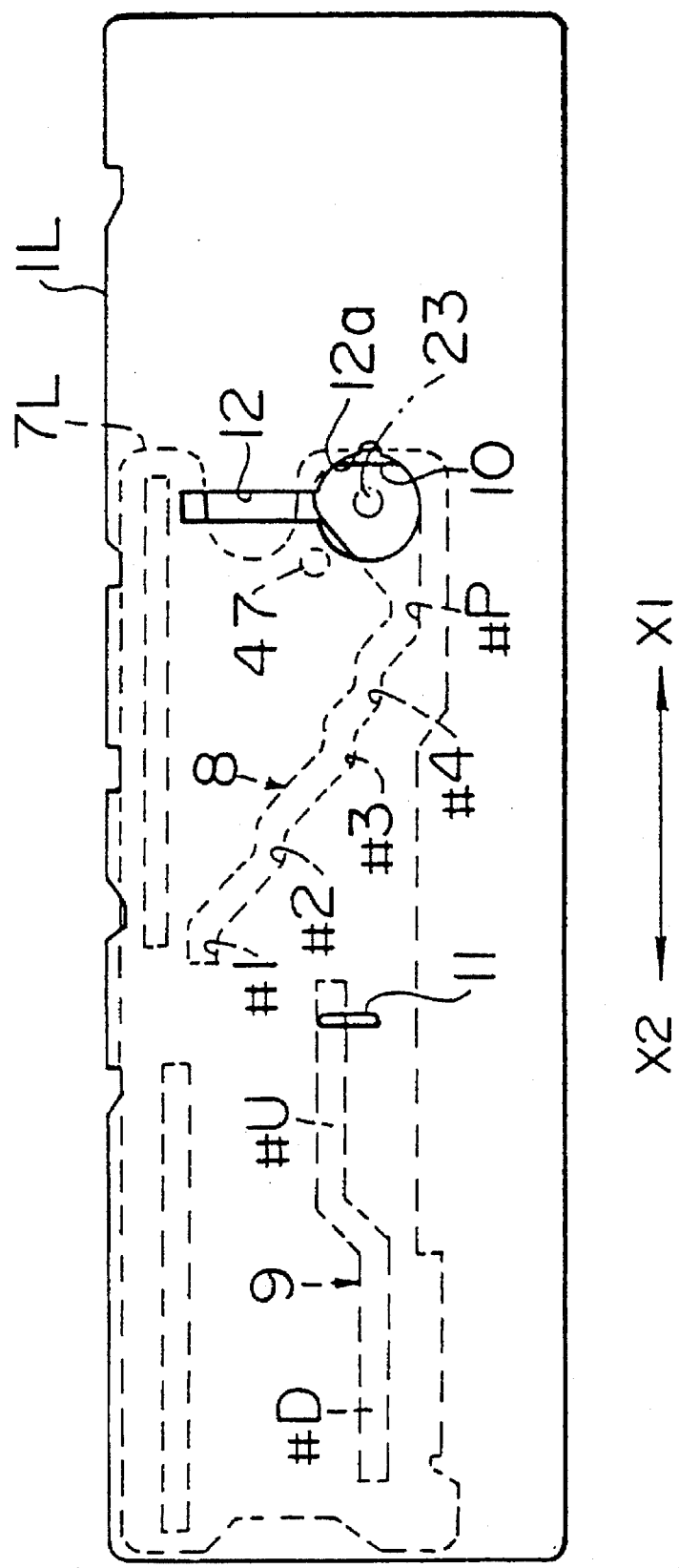
FIG. 19 is a side view showing the left elevator plate which is used in the opening/closing mechanism of the MD unit according to another embodiment of the present invention.

Another embodiment of the present invention is described below with reference to FIG. 19. The left plate 1L of the case 1 has a vertically long holding hole 11, a vertically long guiding hole 12, and a hole portion 12a which is continuous with the bottom end of the guiding hole 12. The holding hole 11 intersects with the stocker cam 9, and the hole portion 12a overlaps the aforementioned hole portion 10. Instead of the pins 34, 35, the cam operating pin 47 is provided on the X1 side of the left elevator plate 7L. The pin 47 controls the swing of the opening member 350 described later and controls the opening/closing of the opening door 300. The right elevator plate 7R is not described in detail because the right elevator plate 7R is the same as in the first embodiment. Further, the operations of the right/left elevator plates 7R, 7L and the constructions of the right/left plates 1R, 1L are not described in detail because they are the same as in the first embodiment.

Figure 20:
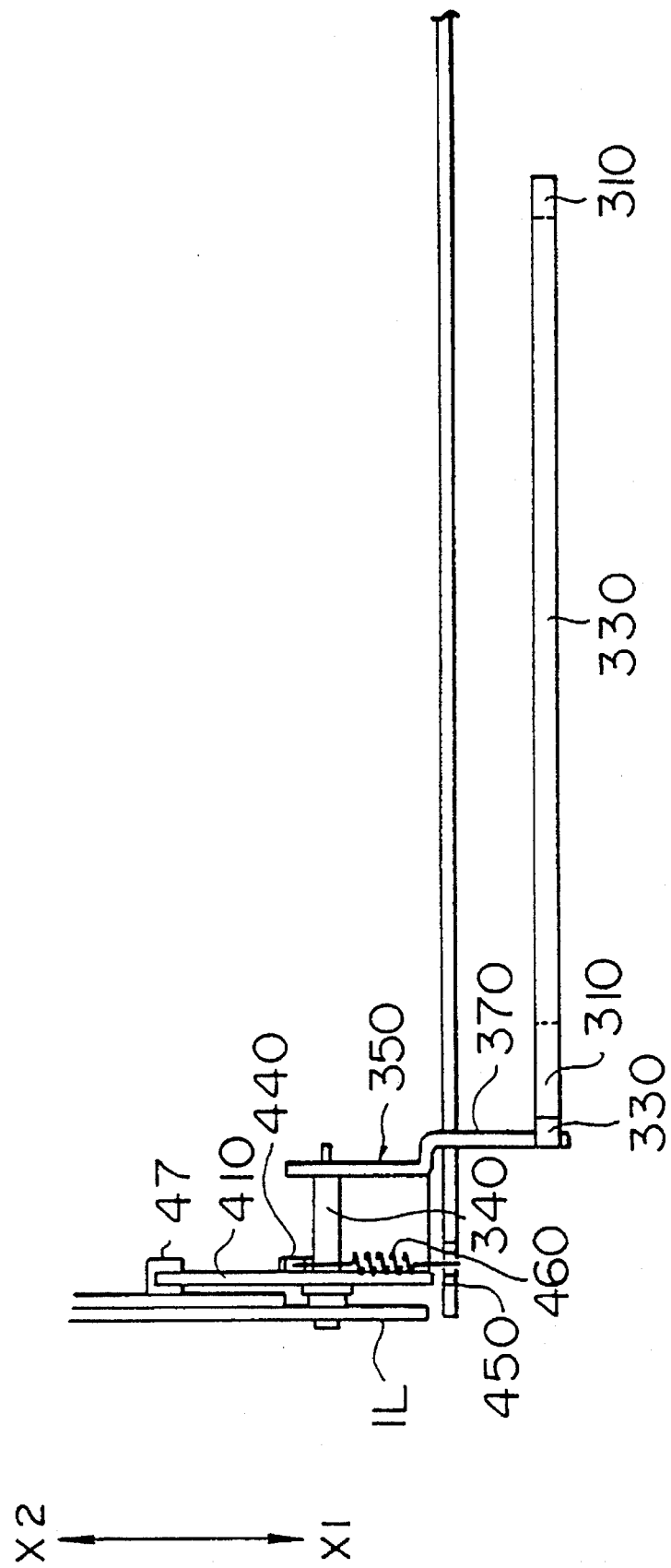
FIG. 20 is a plan view showing the opening/closing mechanism according to the embodiment shown in FIG. 19.
Figure 21:
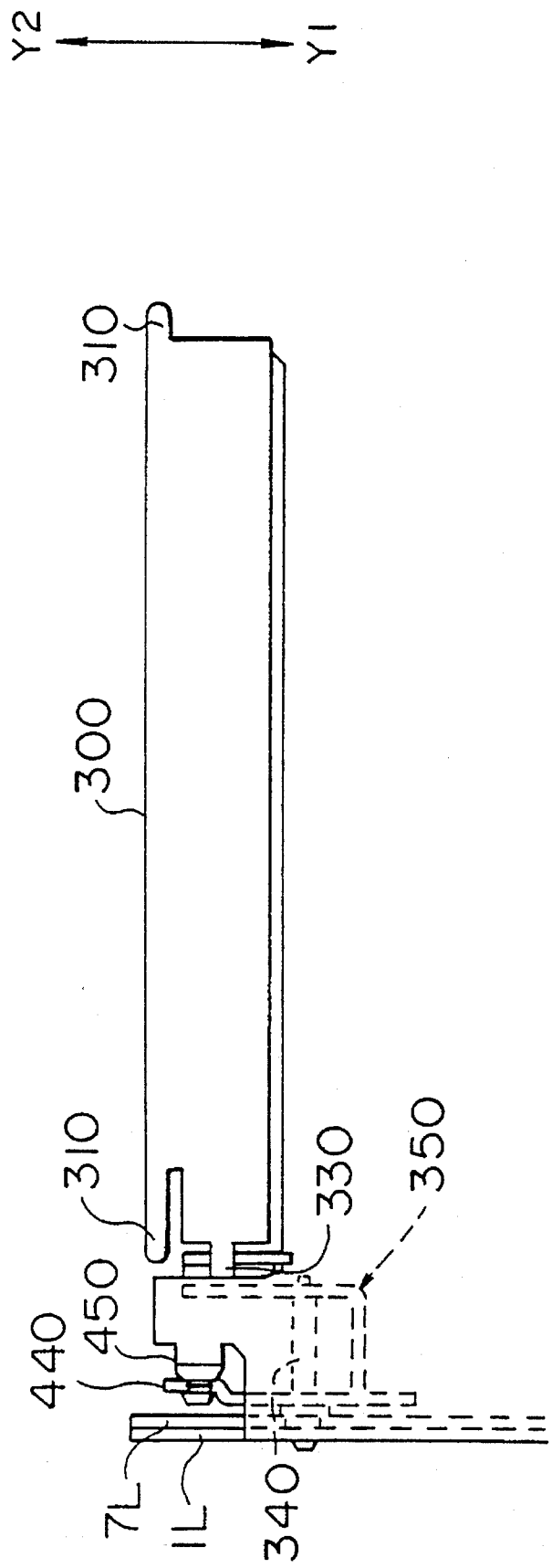
FIG. 21 is a plan view of the opening/closing mechanism shown in FIG. 20.

As shown in FIGS. 20, 21, at the opening portion of the escutcheon (not shown) located on the front side of the case 1, the door 300 is rotatably supported by the supporting portion in which the right/left shaft supporting portions 310 thereof are provided on the escutcheon and the door 300 is mounted so as to close the disk insertion slot by means of a closing spring (not shown). A protrusion 330 is provided on the left end of the dust preventive door 300.

Figure 22:
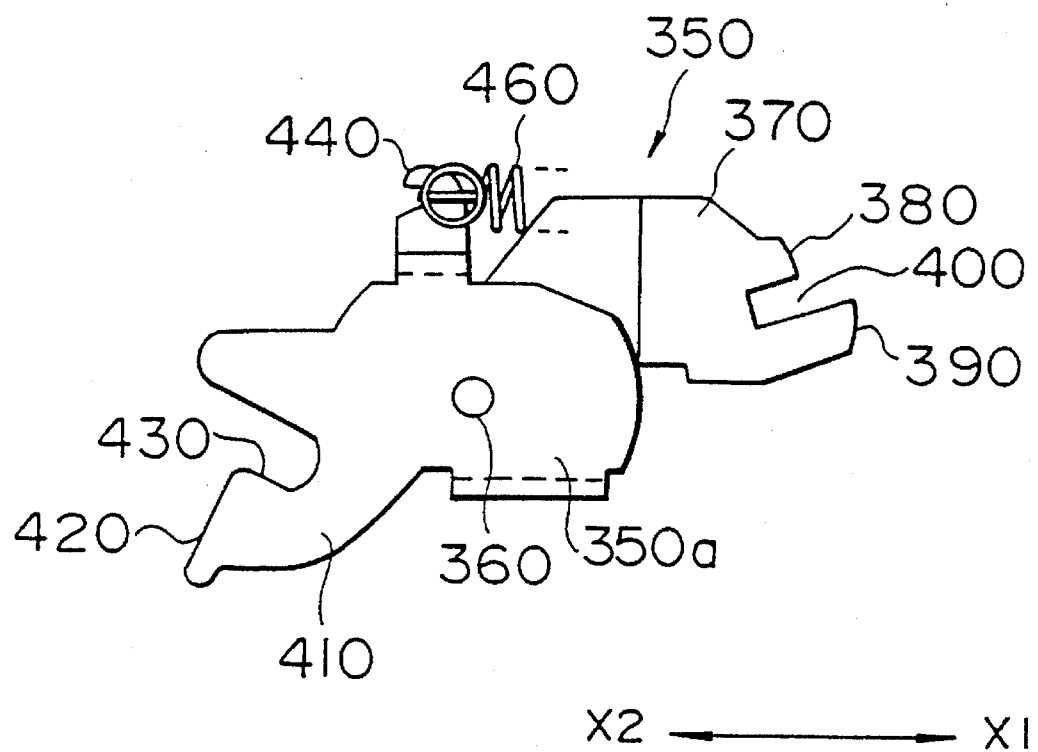
FIG. 22 is a side view of the door controlling member which is used in the opening/closing mechanism shown in FIGS. 20 and 21.

A door controlling member 350 shown in FIG. 22 is mounted on the X1 side of the left plate 1L of the case 1 by means of a shaft 340 so that the opening member 350 is swingable. That is, the door controlling member 350 has a member body 350a having a U-shaped cross-section and the member body 350 has a shaft hole 360. On the inside face of the member body 350, a lever portion 370 is formed so as to protrude forward in the direction of X1. The end of the lever portion 370 has a stopper portion 380, a door-push engaging portion 390, and a dented portion 400 which is located between the stopper portion 380 and the door-push engaging portion 390. On the outside face of the member body 350a, an arm portion 410 is provided so as to protrude in the direction of X2. The end of the arm portion 410 has a cam portion 420 and a dented portion 430, and a spring locking portion 440 is provided on the top portion of the arm portion 410.

The aforementioned door controlling member 350 is provided on the front side of the left plate L1; that is, on the X1 side of the case 1, so that the shaft 340 is inserted through the shaft hole 360 of the member body 350 and a spring 460 is laid between the spring locking portion 440 and the spring locking portion 450 provided on the front side of the case 1.

Figure 23:
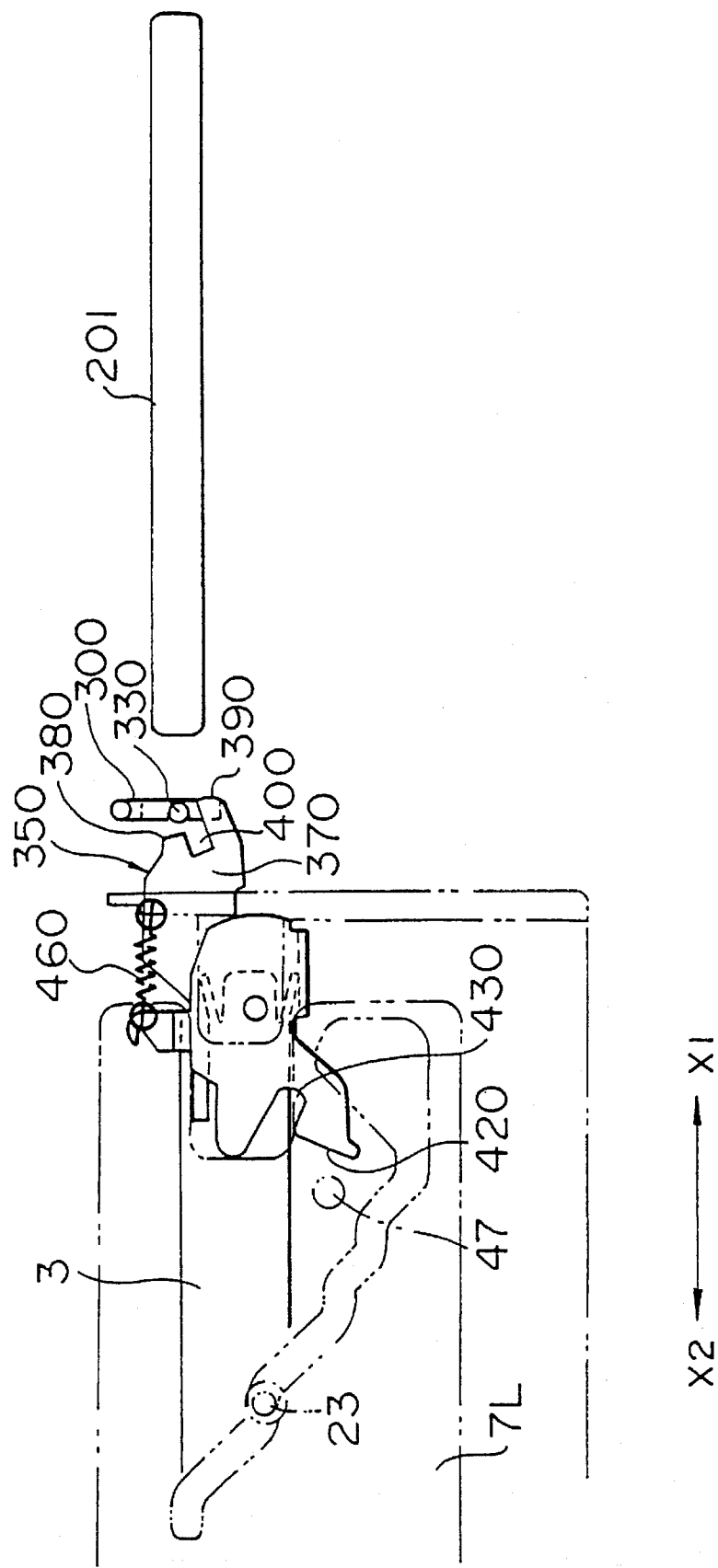
FIGS. 23–29 are side views for explaining the operation of the opening/closing mechanism and showing the relationship between the movement of the carrier and the operation of the opening/closing mechanism.

In FIG. 23, the aforementioned door controlling member 350 is revolved clockwise by the urging force of the spring 460 so that the stopper portion 380 of the lever portion 370 is in contact with or capable of being in contact with the protrusion 330 of the door 300. Thus, the door 300 prevents a disk from being inserted into the device.

Figure 24:
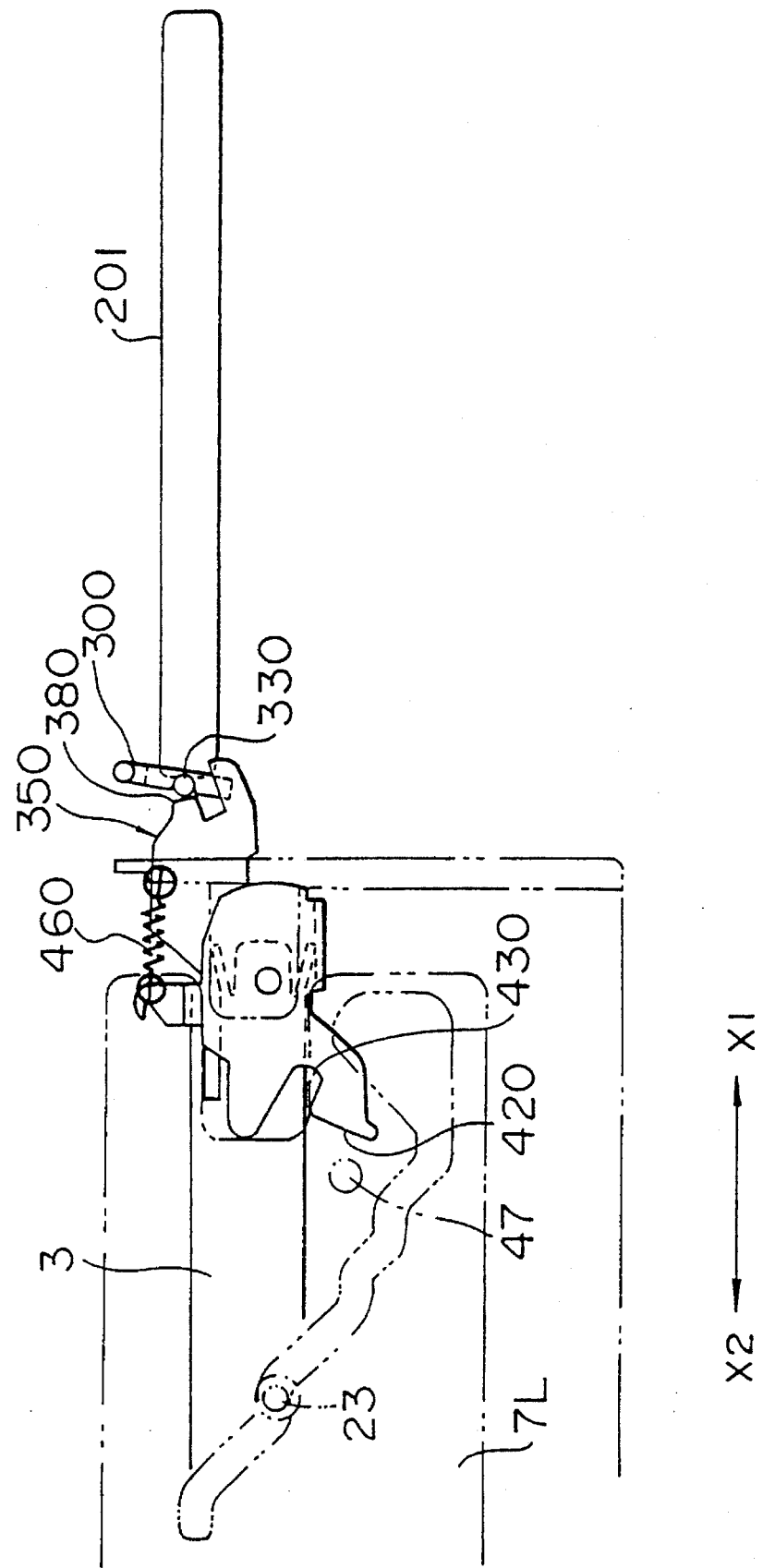
Figure 25:
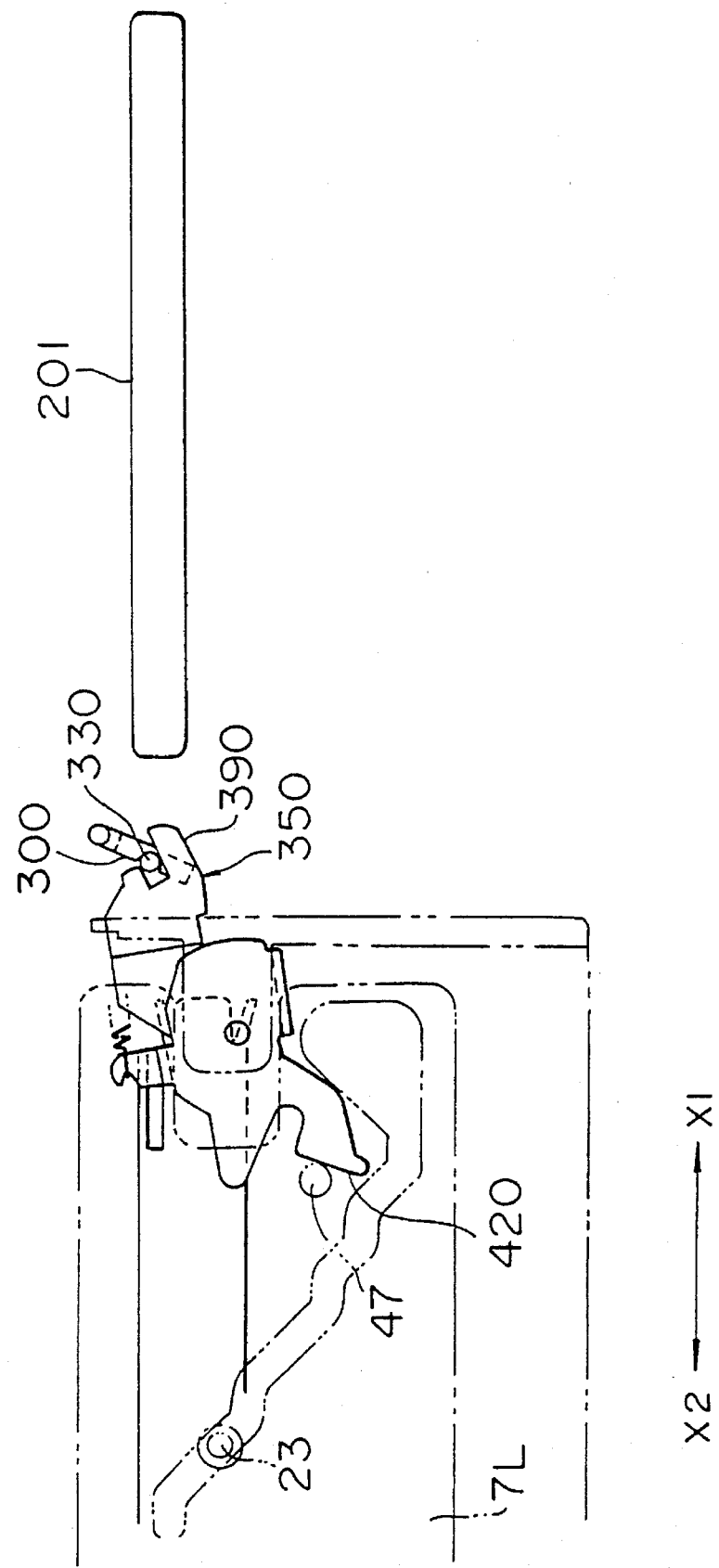
Figure 26:
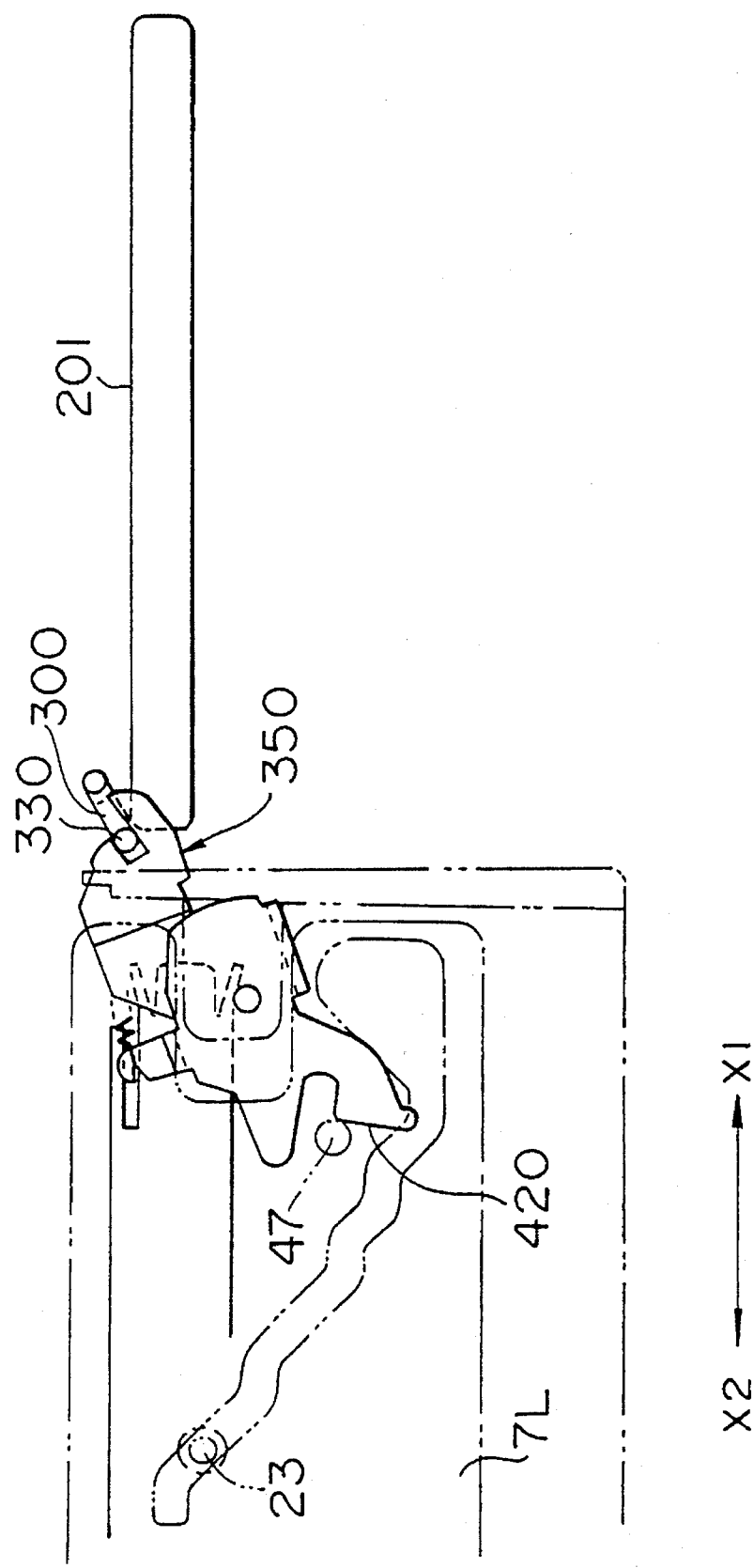
Figure 27:
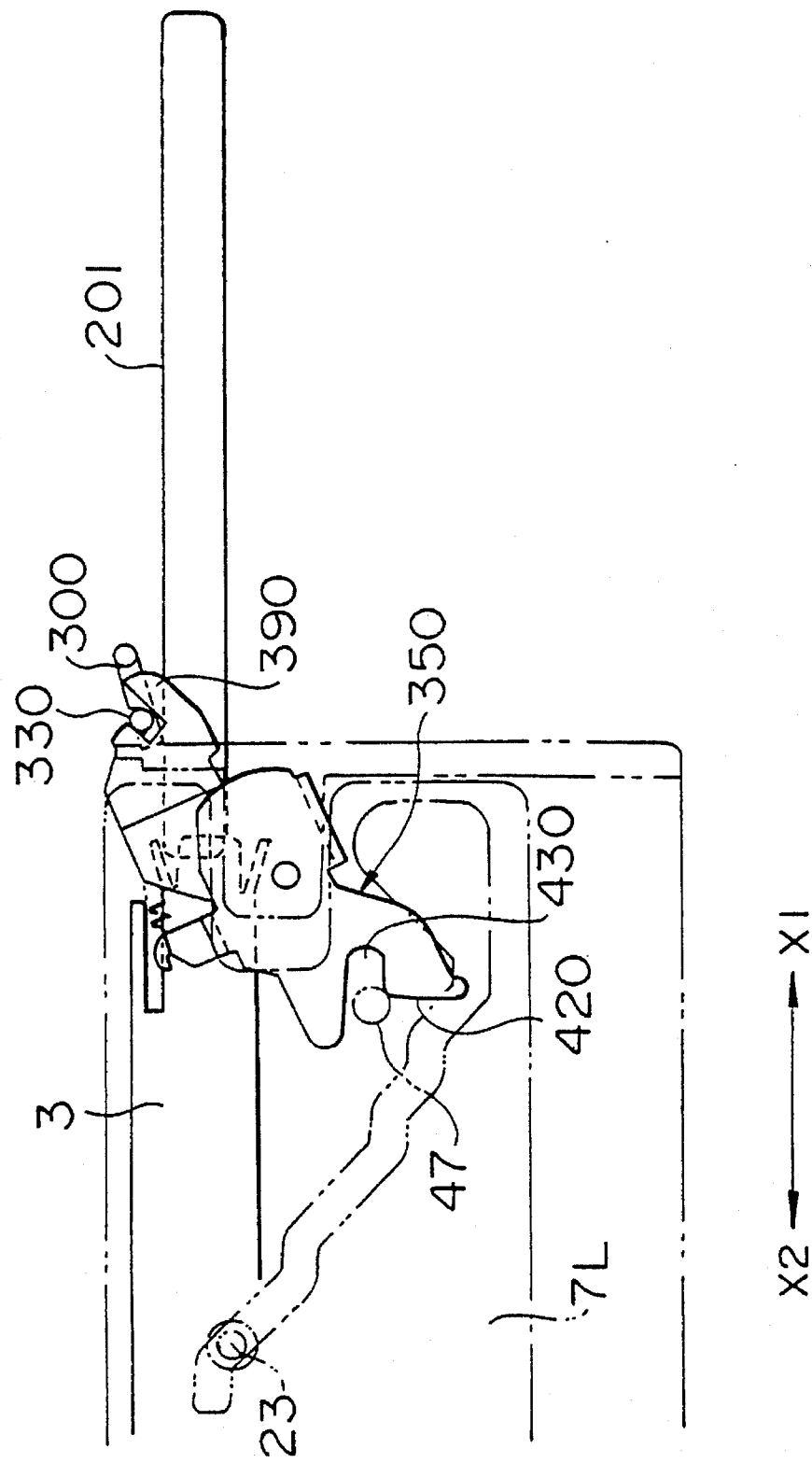
Figure 28:
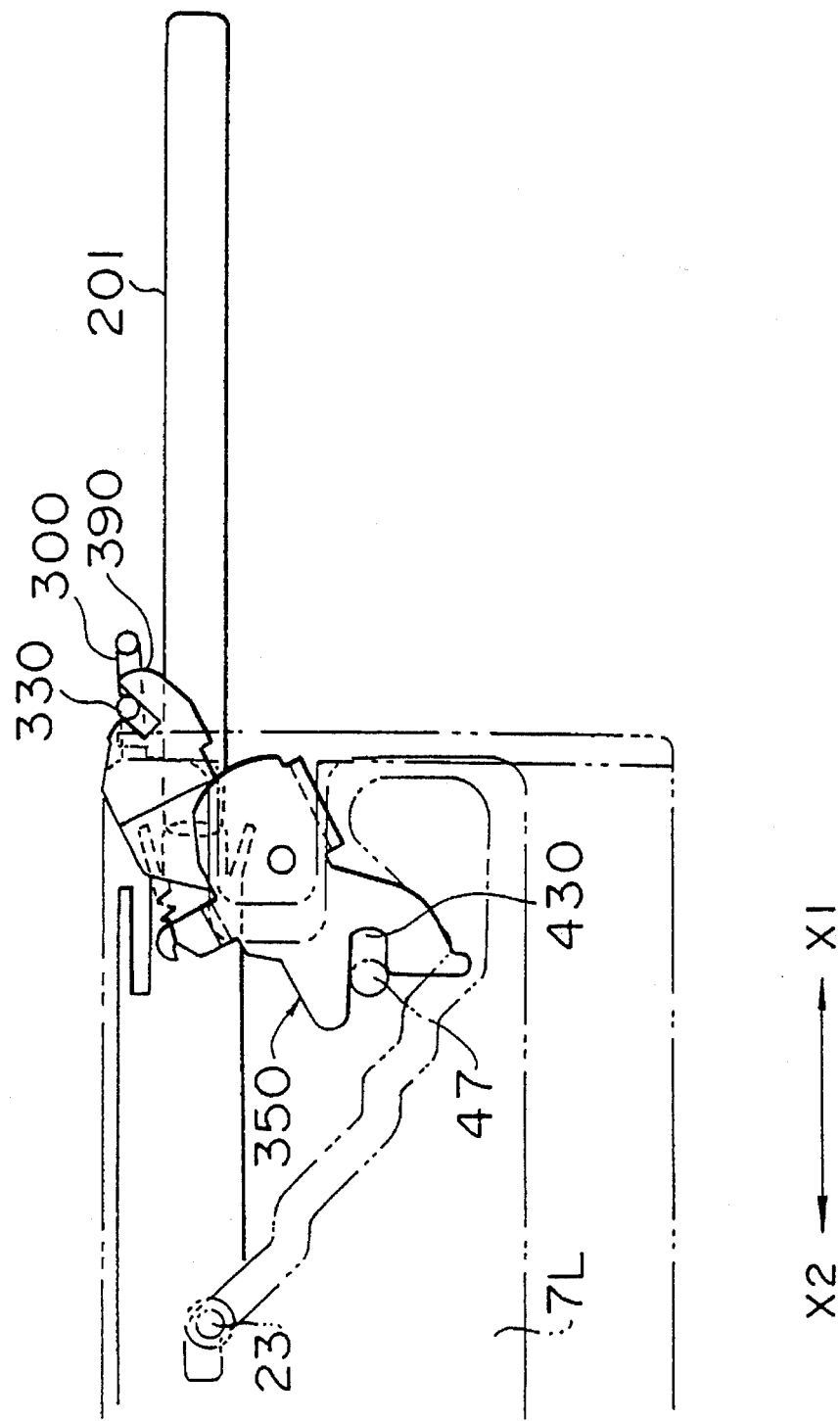

Next, the operation of the opening mechanism of the disk device having the aforementioned construction is described with reference to FIGS. 19 and 5. When the holder pins 23, 24, 25 of the aforementioned carrier 3 are located at the step #2 of the holder cams 8, 13, 14; that is, the carrier 3 is located at a position in which the carrier faces the compartment 50b or the carrier 3 is located below the aforementioned position so that the carrier 3 is not capable of receiving a disk, the aforementioned stopper portion 380 is in contact with or capable of being in contact with the protrusion 330 of the door 300 by means of the urging force of the spring 460. As shown in FIGS. 23, 24, because the disk insertion slot is closed by the door 300, if the user tries to insert a disk 201 into the disk insertion slot through the opening of the escutcheon, the aforementioned door 300 is not opened so that the disk 201 cannot be inserted into the device.

Although the protrusion 330 is not in contact with the stopper portion 380 in FIG. 23, if the door 300 is revolved even slightly by the pressure of the disk 201, the protrusion 330 comes into contact with the stopper portion 380. Thereby the door 300 prevents insertion of the disk 201.

As described above, raising of the carrier 3 is performed by the motion reverse to the motion for descending the carrier 3, the motion being performed by moving the left elevator plate 7L in the direction of X1 side and moving the right elevator plate 7R in the direction of X2 side. Consequently, the carrier 3 is raised to a position in which the carrier 3 is capable of receiving a disk.

As shown in FIGS. 23 and 25–28, when the left elevator plate 7L is moved in the direction of the X1 side, the cam operating pin 47 comes into contact with the cam portion 420 of the dust preventive door controlling member 350, thereby revolving the door controlling member 350 counterclockwise. Thus, the spring 460 is stretched and then the door-push engaging portion 390 of the lever portion 370 of the aforementioned door controlling member 350 pushes the protrusion 330 of the door 300 from below, thereby revolving the dust preventive door 300 to open the disk insertion slot.

Figure 29:
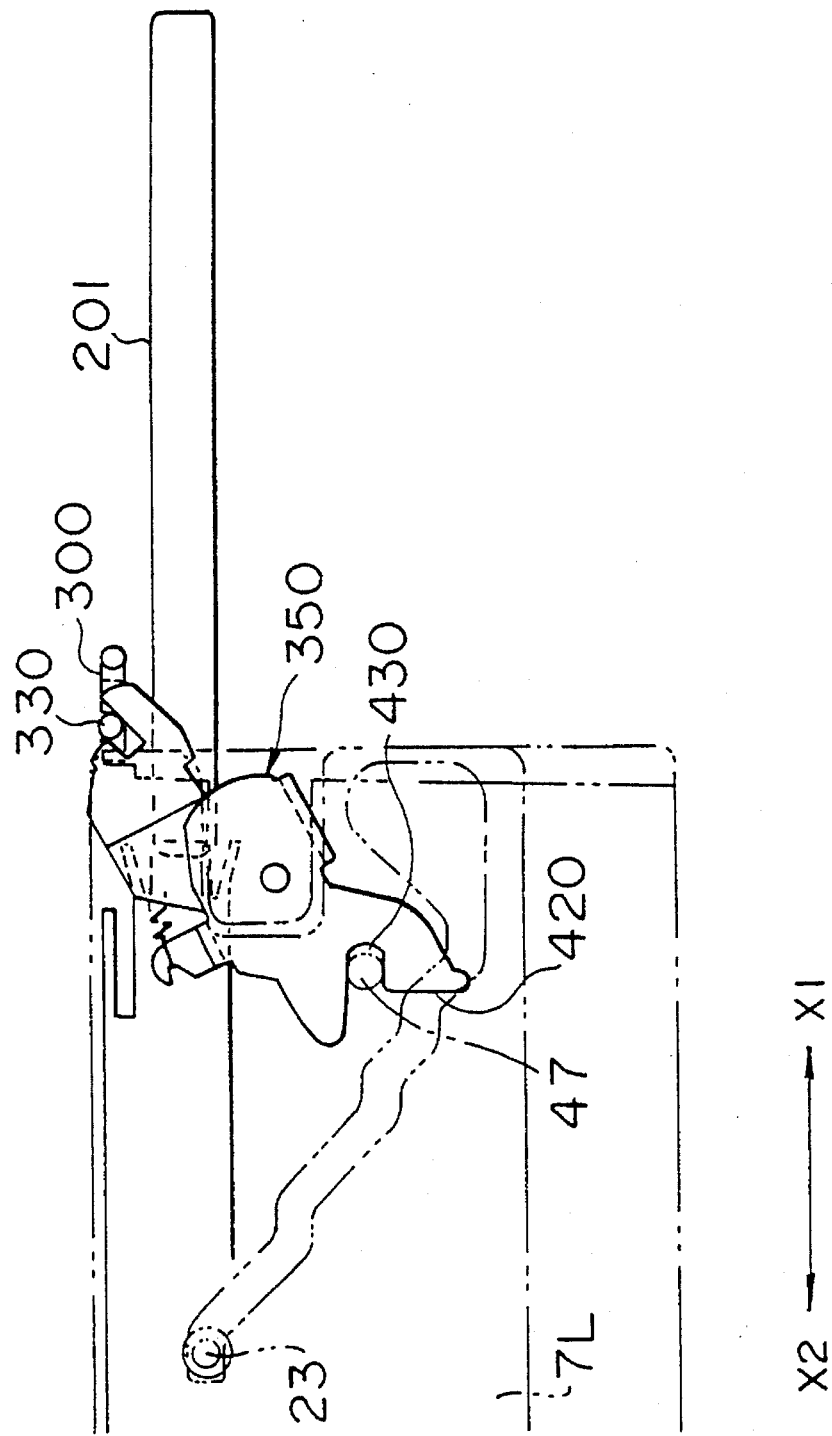

The cam operating pin 47 is engaged with the dented portion 430 of the door controlling member 350 to absorb the displacement of the elevator plate 7L. That is, when the door 300 is fully opened, the dented portion 430 is parallel to the direction in which the elevator plate 7L is moved. Thus, if the cam operating pin 47 is inserted into the dented portion 430, the displacement in the back/forth direction of the elevator plate is absorbed. As a result, it is possible to set the position of the carrier 3 in which the carrier 3 is capable of receiving a disk, if the cam operating pin 47 is inserted into the dented portion 430 as shown in FIG. 29.

In the process in which the carrier 3 ascends to the position in which the carrier is capable of receiving a disk as shown above, the door-push engaging portion 390 of the lever portion 370 of the door controlling member 350 brings up the protrusion 330 of the door 300 from below, thereby revolving the door 300 to open the disk insertion slot. When the carrier 3 is placed at the position in which the carrier 3 is capable of receiving a disk, the disk insertion slot of the case 1 is fully opened. Thus, the disk is inserted into the device and stored in the carrier 3 without being obstructed by the door.

According to the aforementioned embodiment, if the carrier 3 is not placed at the position in which the carrier 3 is capable of receiving a disk, the disk insertion slot is closed by the door 300 while the stopper portion 380 of the door controlling member 350 is in contact with the protrusion 330 of the dust preventive door 300, the disk 201 can be prevented from being inserted by mistake into the disk device. Further, because the door controlling member 350 is provided with a stopper portion 380 which is in contact with the door 300, thereby eliminating the necessity of a shutter or the like, it is possible to realize an opening mechanism at low cost with minimized number of parts.

According to the present embodiment, because the door controlling member 350 is provided at only one side of the door 300, the door 300 is twisted if the user tries to insert the disk 201 forcibly when the door is closed; that is, when the door is locked, so that the door may be deformed. In order to prevent this phenomenon, the strength of the door 300 is increased or the door controlling members 350 are disposed at both sides of the door 300 to prevent the door 300 from being twisted.

As described above, a closing spring (not shown) is disposed at the door 300 so that the door 300 is constructed to always close the disk insertion slot. Because the door 300 is closed when the protrusion 330 provided on the door 300 is forcibly guided below the protrusion 400 provided at the door controlling member 350, the closing spring is not always necessary.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A data processing device comprising:

holding means for holding a cassette member encasing a recording medium in which information to be processed by said device is stored, said cassette member being inserted into said device through an insertion slot;

means for reproducing recorded information on the recording medium;

lifting means for moving said holding means vertically, including a pair of movable plate members;

an opening/closing means for opening/closing said insertion slot which are disposed inside said insertion slot so as to be vertically swingable;

a spring for urging said opening/closing means so as to close said insertion slot;

a controlling means for controlling the opening/closing of said opening/closing means when said holding means is moved to a position in which said holding means faces said insertion slot by means of said lifting means wherein said controlling means comprises a pin formed on one of said plate members and a cam is formed on said opening/closing means, said pin and said cam being made to contact each other when said holding means is opposed to said insertion slot;

a door disposed outside said opening/closing means; and door controlling means for controlling the opening/closing of said door when said holding means is moved to a position in which said holding means faces said insertion slot by means of said lifting means, wherein said opening/closing means and said door are coaxially and swingably disposed.

2. A data processing device according to claim 1 wherein said door controlling means comprises a door controlling member and a cam operating pin which is provided on one of said plate members.

3. A data processing device according to claim 2, wherein said door controlling means pin and controlling means pin are formed on the same plate member.

4. A data processing device according to claim 1 wherein said spring connects said opening/closing means with said door controlling member.

5. In a data processing device for processing data stored in a plurality of recording medium cassettes having a housing with an aperture to receive and discharge the cassettes, the improvement comprising:

a holding means for receiving a cassette that has been inserted through the aperture;

storing means for storing a plurality of cassettes, the holding means delivering the cassettes to the storing means and receiving stored cassettes from the storing means;

closing means for closing the aperture including a shutter member; and a movable elevator plate means for operatively contacting the holding means, storing means, and closing means to enable the closing means to open when the holding means can receive a cassette inserted through the aperture and to hold the closing means in a closed position when the holding means is moved from a position adjacent the aperture.

6. A data processing device according to claim 5 wherein said movable elevator plate means includes a pair of elevator plates that can simultaneously move in opposite directions, the elevator plates being positioned respectively on either side of the holding means and the storing means.

7. In a player for providing sound reproduction from digital recorded audio cassette members, the improvement comprising:

holding means for holding a cassette member encasing a recording medium in which audio information to be processed by said device is stored, said cassette member being inserted into said device through an insertion slot;

lifting means for moving said holding means vertically including a pair of elevator plate members;

shutter means for controlling access to said insertion slot;

biasing means for urging said shutter means so as to close said insertion slot;

a shutter controlling means for controlling the shutter means when said holding means is moved to a position in which said holding means faces said insertion slot by means of said lifting means, wherein said shutter controlling means comprises a pin formed on one of said plate members and a cam formed on said shutter means, said pin and said cam being made to contact each other when said holding means is opposed to said insertion opening;

a door disposed outside said shutter means; and door controlling means for controlling the opening/closing of said door when said holding means is moved to a position in which said holding means faces said insertion slot by means of said lifting means, wherein said door controlling means comprises a door controlling member and a cam operating pin which is provided on one of said plate members.

8. A player according to claim 7 wherein said shutter means and said door are disposed coaxially swingably.

* * * * *